United States Patent
Munaoka et al.

(10) Patent No.: US 11,228,025 B2
(45) Date of Patent: Jan. 18, 2022

(54) ANODE FOR SECONDARY BATTERY, SECONDARY BATTERY, BATTERY PACK, ELECTRIC MOTOR VEHICLE, POWER STORAGE SYSTEM, ELECTRIC TOOL, AND ELECTRONIC DEVICE

(71) Applicant: MURATA MANUFACTURING CO., LTD., Kyoto (JP)

(72) Inventors: Takatoshi Munaoka, Kyoto (JP); Masayuki Ihara, Kyoto (JP); Shigeru Fujita, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 153 days.

(21) Appl. No.: 16/523,520

(22) Filed: Jul. 26, 2019

(65) Prior Publication Data

US 2019/0348670 A1     Nov. 14, 2019

Related U.S. Application Data

(63) Continuation of application No. PCT/JP2017/037362, filed on Oct. 16, 2017.

(30) Foreign Application Priority Data

Jan. 31, 2017    (JP) ................... 2017-015529

(51) Int. Cl.
*H01M 4/36*      (2006.01)
*H01M 4/587*     (2010.01)
(Continued)

(52) U.S. Cl.
CPC ........... *H01M 4/364* (2013.01); *H01M 4/587* (2013.01); *H01M 4/622* (2013.01);
(Continued)

(58) Field of Classification Search
CPC ...... H01M 4/364; H01M 4/587; H01M 4/622; H01M 10/0525; H01M 2004/021;
(Continued)

(56) References Cited

U.S. PATENT DOCUMENTS

2006/0147799 A1*   7/2006   Hayashi ................ H01M 4/621
                                                                                 429/231.8
2007/0190412 A1*   8/2007   Chiga ............... H01M 10/0525
                                                                                429/200

(Continued)

FOREIGN PATENT DOCUMENTS

JP          9-320605      12/1997
JP       H09320605 A   12/1997
(Continued)

OTHER PUBLICATIONS

Park et al. "Effect of carbon coating on thermal stability of natural graphite spheres used as anode materials in lithium-ion batteries." Journal of Power Sources 190 (2009) 553-557 (Year: 2009).*

(Continued)

*Primary Examiner* — Michael L Dignan
(74) *Attorney, Agent, or Firm* — K&L Gates LLP

(57) ABSTRACT

A secondary battery includes a cathode, an anode, and an electrolytic solution, in which the anode includes a plurality of first anode active material particles, a plurality of second anode active material particles, a first anode binder, and a second anode binder. The plurality of first anode active material particles include carbon, and an R value of the plurality of first anode active material particles is from 0.35 to 0.45, and a median diameter of the plurality of first anode (Continued)

active material particles is from 5 μm to 14.5 μm. The plurality of second anode active material particles include carbon, and the R value of the plurality of second anode active material particles is from 0.1 to 0.25, and a median diameter of the plurality of second anode active material particles is from 15 μm to 25 μm.

10 Claims, 7 Drawing Sheets

(51) Int. Cl.
    *H01M 4/62*     (2006.01)
    *H01M 10/0525*     (2010.01)
    *H01M 4/02*     (2006.01)

(52) U.S. Cl.
    CPC .. *H01M 10/0525* (2013.01); *H01M 2004/021* (2013.01); *H01M 2004/027* (2013.01)

(58) Field of Classification Search
    CPC ........... H01M 2004/027; H01M 4/623; H01M 4/133; Y02E 60/10
    See application file for complete search history.

(56) References Cited

U.S. PATENT DOCUMENTS

| | | | |
|---|---|---|---|
| 2009/0280413 A1* | 11/2009 | Ohta | C01B 32/21 429/231.8 |
| 2012/0064403 A1 | 3/2012 | Kameda et al. | |
| 2013/0216891 A1 | 8/2013 | Byun et al. | |
| 2016/0322636 A1* | 11/2016 | Lee | H01M 4/587 |
| 2017/0149057 A1* | 5/2017 | Sugita | H01M 10/0525 |
| 2017/0317383 A1* | 11/2017 | Kawabe | H01M 4/364 |

FOREIGN PATENT DOCUMENTS

| | | |
|---|---|---|
| JP | 2010251314 A | 11/2010 |
| JP | 2013171838 A | 9/2013 |
| JP | 2016-024934 | 2/2016 |
| JP | 2016024934 A | 2/2016 |
| WO | 2016068033 A1 | 5/2016 |
| WO | 2016068033 | 8/2017 |

OTHER PUBLICATIONS

Japanese Office Action dated Sep. 1, 2020 in corresponding Japanese Application No. 2018-565928.

International Search Report for Application No. PCT/JP2017/037362, dated Jan. 16, 2018.

* cited by examiner

ANODE FOR SECONDARY BATTERY, SECONDARY BATTERY, BATTERY PACK, ELECTRIC MOTOR VEHICLE, POWER STORAGE SYSTEM, ELECTRIC TOOL, AND ELECTRONIC DEVICE

CROSS REFERENCE TO RELATED APPLICATIONS

The present application is a continuation of PCT patent application no. PCT/JP2017/037362, filed on Oct. 16, 2017, which claims priority to Japanese patent application no. JP2017-015529 filed on Jan. 31, 2017, the entire contents of which are being incorporated herein by reference.

BACKGROUND

The present technology generally relates to an anode for a secondary battery including an anode active material and an anode binder, a secondary battery using the anode for a secondary battery, and a battery pack using the secondary battery, an electric motor vehicle, a power storage system, an electric tool, and an electronic device.

Various electronic devices such as a mobile phone and a personal digital assistant (PDA) are becoming widespread, and there is a growing demand for downsizing, weight reduction and long life of the electronic devices. To meet the demand, a battery as a power supply, in particular, a secondary battery which can downsize, can be lightweight, and obtain high energy density is being developed.

The secondary battery is not limited to the electronic devices described above, and application of the secondary battery for other uses is under consideration. Examples of other uses include a battery pack removably mounted on each electronic device or the like, an electric motor vehicle such as an electric vehicle, a power storage system such as a home power server, or an electric tool such as an electric drill.

The secondary battery includes an electrolytic solution together with a cathode and an anode, and the anode includes an anode active material and an anode binder. Since a configuration of the anode has a great effect on battery characteristics, various studies have been made on the configuration of the anode.

SUMMARY

The present technology generally relates to an anode for a secondary battery including an anode active material and an anode binder, a secondary battery using the anode for a secondary battery, and a battery pack using the secondary battery, an electric motor vehicle, a power storage system, an electric tool, and an electronic device.

The electronic devices described above are becoming more high-performance and multifunctional. As a result, the use frequency of the electronic devices and the like is increasing, and the use environment of the electronic devices and the like is expanding. Therefore, the battery characteristics of the secondary battery still have room for improvement.

Accordingly, it is preferable to provide an anode for a secondary battery, a secondary battery, a battery pack, an electric motor vehicle, a power storage system, an electric tool, and an electronic device capable of obtaining excellent battery characteristics.

According to an embodiment of the present technology, an anode for a secondary battery is provided. The anode includes a plurality of first anode active material particles, a plurality of second anode active material particles, a first anode binder, and a second anode binder. The plurality of first anode active material particles include carbon, and an R value of the plurality of first anode active material particles is from 0.35 to 0.45, and a median diameter of the plurality of first anode active material particles is from 5 µm to 14.5 µm. The plurality of second anode active material particles include carbon, and the R value of the plurality of second anode active material particles is from 0.1 to 0.25, and a median diameter of the plurality of second anode active material particles is from 15 µm to 25 µm. A ratio of a weight of the plurality of first anode active material particles to a total of the weight of the plurality of first anode active material particles and a weight of the plurality of second anode active material particles is from 10% by weight to 50% by weight. The first anode binder includes one or both of styrene-butadiene rubber and a derivative thereof, and the second anode binder includes one or both of polyvinylidene fluoride and a derivative thereof.

A secondary battery according to an embodiment of the present technology includes an electrolytic solution together with a cathode and an anode, and the anode has the same configuration as that of the anode as described herein according to an embodiment of the present technology.

According to an embodiment of the present technology, a battery pack, an electric motor vehicle, a power storage system, an electric tool, and an electronic device each include a secondary battery, and the secondary battery has the same configuration as that of the secondary battery as described herein according to the embodiment of the present technology.

Here, the "R value" is measured by analyzing a plurality of first anode active material particles or a plurality of second anode active material particles using Raman spectroscopy. This R value is ID/IG which is a ratio of intensity ID of a Raman spectrum peak existing in a range of 1350 $cm^{-1}$ to 1370 $cm^{-1}$ to intensity IG of a Raman spectrum peak existing in a range of 1570 $cm^{-1}$ to 1630 $cm^{-1}$. In other words, the R value is an intensity ratio of D band width to G band width. However, a laser used for the Raman spectroscopy is an argon laser (wavelength=514.5 nm).

According to the anode for a secondary battery or the secondary battery of the embodiment of the present technology, the anode includes the plurality of first anode active material particles, the plurality of second anode active material particles, the first anode binder, and the second anode binder, and the conditions as described herein for materials, physical properties, dimensions, and mixing ratios of each of the plurality of first anode active material particles, the plurality of second anode active material particles, the first anode binder, and the second anode binder are satisfied, such that the excellent battery characteristics can be obtained.

In addition, the battery pack, the electric motor vehicle, the power storage system, the electric tool, or the electronic device according to an embodiment of the present technology can also obtain the same effects.

The effects described herein are not necessarily limited, and other suitable properties relating to the present technology may be realized and as further described.

DETAILED DESCRIPTION

As described herein, the present disclosure will be described based on examples with reference to the drawings, but the present disclosure is not to be considered limited to the examples, and various numerical values and materials in the examples are considered by way of example.

First, an anode for a secondary battery according to an embodiment of the present technology will be described.

The anode for a secondary battery (hereinafter, simply referred to as "anode") according to an embodiment of the present technology is used, for example, in an electrochemical device such as a secondary battery. A type of secondary battery to which the anode is applied is not particularly limited, but is, for example, a secondary battery or the like which obtains battery capacity by occluding and releasing an electrode reactant.

The electrode reactant is a material involved in the electrode reaction using the anode, and the electrode reactant is occluded and released at the anode. As a specific example of the type of secondary battery, a secondary battery using lithium (or lithium ion) as the electrode reactant is a so-called lithium ion secondary battery.

An anode has a configuration described below.

Figure 1:
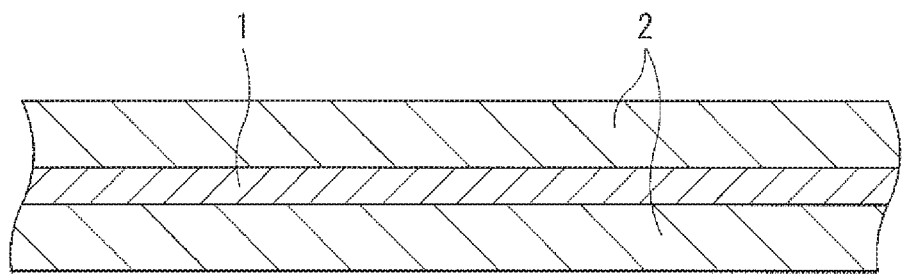
FIG. 1 is a cross-sectional view illustrating a configuration of an anode for a secondary battery according to an embodiment of the present technology.

FIG. 1 illustrates a cross-sectional configuration of an anode. For example, as illustrated in FIG. 1, the anode includes an anode current collector 1 and an anode active material layer 2 provided on the anode current collector 1.

The anode active material layer 2 may be provided only on one surface of the anode current collector 1 or may be provided on both surfaces of the anode current collector 1. FIG. 1 illustrates, for example, a case where the anode active material layer 2 is provided on both surfaces of the anode current collector 1.

The anode current collector 1 contains, for example, one or more of conductive materials. The type of conductive material is not particularly limited, but is, for example, metal materials such as copper, aluminum, nickel and stainless steel. The metal material is not limited to metal alone but may be an alloy. The anode current collector 1 may be a single layer or a multilayer.

A surface of the anode current collector 1 is preferably roughened. This is because an adhesion between the anode active material layer 2 and the anode current collector 1 is improved by a so-called anchor effect. In this case, the surface of the anode current collector 1 only has to be roughened at least in a region facing the anode active material layer 2. Examples the roughening method can include a method of forming fine particles using electrolytic treatment. In the electrolytic treatment, since fine particles are formed on the surface of the anode current collector 1 in an electrolytic cell by the electrolytic method, irregularities are provided on the surface of the anode current collector 1. A copper foil produced by the electrolytic method is generally called an electrolytic copper foil.

The anode active material layer 2 contains two types of anode active materials and two types of anode binders. However, the anode active material layer 2 may further contain one or more of other materials such as an anode conductive agent.

Specifically, the anode active material layer 2 contains a plurality of particulate anode active materials (a plurality of first anode active material particles) and a plurality of particulate anode active materials (a plurality of second anode active material particles) as the two types of anode active materials described above.

In addition, the anode active material layer 2 contains a first anode binder and a second anode binder as the two types of anode binders described above.

As described above, the plurality of first anode active material particles are dispersed in the anode active material layer 2 because they are a plurality of particulate anode active materials.

The "particles (or particulates)" described above means that each of the plurality of first anode active material particles is granular physically separated from each other. That is, when a cross section of the anode active material layer 2 including the plurality of first anode active material particles is observed using a microscope such as an electron microscope, each of the plurality of first anode active material particles is recognized as a granular object in the observed result (photomicrograph).

However, the shape of the first anode active material particle is not particularly limited. That is, the shape of each of the plurality of first anode active material particles may be spherical, substantially spherical, or any other shapes. Naturally, the shapes of the plurality of first anode active material particles may be the same as each other, or may be different from each other. In addition, two different shapes from each other may coexist.

The first anode active material particle contains, as an anode material capable of occluding and releasing an electrode reactant, one or more of materials containing carbon as a constituent element. Hereinafter, a material containing carbon as a constituent element is referred to as a "carbon-based material".

The reason why the first anode active material particle contains the carbon-based material is that since a crystal structure of the carbon-based material hardly changes during the occlusion and releasing of the electrode reactant, high energy density can be stably obtained. In addition, since the carbon-based material also serves as the anode conductive agent, the conductivity of the anode active material layer 2 is improved.

The carbon-based material is, for example, a carbon material such as graphitizable carbon, non-graphitizable carbon, and graphite. However, a spacing of (002) plane relating to the non-graphitizable carbon is preferably 0.37 nm or more, and a spacing of (002) plane relating to the graphite is preferably 0.34 nm or less. More specifically, the carbon material is, for example, pyrolytic carbons, cokes, glassy carbon fibers, organic polymer compound fired bodies, activated carbon, carbon blacks, and the like. The cokes include pitch coke, needle coke, and petroleum coke. The organic polymer compound fired body is a polymer compound fired (carbonized) at an appropriate temperature, and the polymer compound is, for example, a phenol resin, a furan resin, or the like. In addition, the carbon material may be low crystalline carbon heat-treated at a temperature of about 1000° C. or less, or may be amorphous carbon. The shape of the carbon material may be any of fibrous, spherical, granular, and scaly.

The plurality of first anode active material particles have predetermined physical properties and dimensions. Specifically, an R value of the plurality of first anode active material particles ranges from 0.35 to 0.45. In addition, an average particle diameter (median diameter D50) of the plurality of first anode active material particles ranges from 5 μm to 14.5 μm.

As described above, the R value is measured by analyzing the plurality of first anode active material particles using Raman spectroscopy. This R value is ID/IG which is a ratio of intensity ID of a Raman spectrum peak existing in a range of 1350 cm$^{-1}$ to 1370 cm$^{-1}$ to intensity IG of a Raman spectrum peak existing in a range of 1570 cm$^{-1}$ to 1630 cm$^{-1}$. In other words, the R value is an intensity ratio of D band width to G band width. However, a laser used for the Raman spectroscopy is an argon laser (wavelength=514.5 nm).

The median diameter D50 can be measured, for example, using a particle size distribution analyzer. This particle size distribution analyzer is, for example, a laser diffraction/scattering particle size distribution measuring apparatus LA-960 manufactured by Horiba, Ltd., or the like.

In addition, the plurality of first anode active material particles have a predetermined mixing ratio. Specifically, a ratio of a weight of the plurality of first anode active material particles to a total of the weight of the plurality of first anode active material particles and a weight of the plurality of second anode active material particles ranges from 10% by weight or more to 50% by weight. This ratio is calculated based on ratio (wt %)=(weight of plurality of first anode active material particles/total of weight of plurality of first anode active material particles and weight of plurality second anode active material particles)×100.

As described above, the plurality of second anode active material particles are dispersed in the anode active material layer 2 because they are the plurality of particulate anode active materials, like the plurality of first anode active material particles. The definition regarding "particles (or particulate form)" is as described above.

Like the first anode active material particles, the second anode active material particles can contain one or more of the carbon-based materials as the anode material capable of occluding and releasing the electrode reactant. The reason why the second anode active material particle contains the carbon-based material is the same as the reason that the first anode active material particle contains the carbon-based material. The details of the carbon-based material are as described above. However, the type of carbon-based material contained in the second anode active material particle may be, for example, the same as the type of carbon-based material contained in the first anode active material particle, or may be different from the type of carbon-based material contained in the first anode active material particle.

The plurality of second anode active material particles have predetermined physical properties and dimensions. Specifically, the R value of the plurality of second anode active material particles ranges from 0.1 to 0.25. The definition of the R value described herein is as described above except that the R value is measured by analyzing the plurality of second anode active material particles. In addition, an average particle diameter (median diameter D50) of the plurality of second anode active material particles ranges from 15 μm to 25 μm. The details of each of the measurement procedure of the R value and the measurement method of the median diameter D50 are as described above. In addition, the plurality of second anode active material particles have a predetermined mixing ratio. Specifically, as is apparent from the mixing ratio of the plurality of first anode active material particles described above, the ratio of the weight of the plurality of second anode active material particles to the total of the weight of the plurality of first anode active material particles and the weight of the plurality of second anode active material particles ranges from 50% by weight to 90% by weight. This ratio is calculated based on ratio (wt %)=(weight of plurality of second anode active material particles/total of weight of plurality of first anode active material particles and weight of plural second anode active material particles)×100.

Here, a graphite orientation of the two types of anode active materials (the plurality of first anode active material particles and the plurality of second anode active material particles) described above is not particularly limited.

The graphite orientation is a ratio P (=P2/P1) of a peak integrated intensity P2 resulting from (002) plane of the two types of anode active materials measured by an X-ray diffraction method to a peak integrated intensity P1 resulting from (110) planes of the two types of anode active materials measured by the X-ray diffraction method. However, a position 2θ of the peak resulting from the (110) plane is 76.3°, and a position of the peak resulting from the (002) plane is 26.5°.

Among them, the ratio P is preferably 36 to 42. Since the graphite orientation of the two types of anode active materials (the plurality of first anode active material particles and the plurality of second anode active material particles) is optimized, the anode is likely to occlude and release the electrode reactant.

The procedure for specifying each of the above-described material, R value, median diameter D50 (μm), and mixing ratio (% by weight) of the anode (two types of anode active materials) used in the secondary battery is, for example, as follows.

First, after the anode is recovered by disassembling the secondary battery in a fully discharged state, the anode current collector 1 is peeled off from the anode active material layer 2. Subsequently, after the anode active material layer 2 is introduced into a solvent, the solvent is stirred to dissolve the first anode binder, the second anode binder, and the like. As a result, the two types of anode active materials (the plurality of first anode active material particles and the plurality of second anode active material particles) are recovered. The type of solvent is not particularly limited, but is, for example, one or more of pure water and N-methyl-2-pyrrolidone. Subsequently, the two types of anode active materials are separated using a floating precipitation method using a centrifugal separator or the like. The floating precipitation method disperses the two types of anode active materials in a solvent such as water, and then selectively samples a floating lightweight anode active material while processing the two types of anode active materials using a centrifugal separator, thereby separating the two types of anode active materials depending on the particle size. In this case, when the centrifugal separator is used, the processing conditions such as the number of revolutions and a standing time are changed. In addition, a blending ratio of the two types of anode active materials is specified by measuring the particle size of the anode active material using dynamic light scattering (DLS) or the like. As a result, the plurality of first anode active material particles are recovered, and the plurality of second anode active material particles are recovered.

Finally, each of the plurality of first anode active material particles and the plurality of second anode active material particles is analyzed using various analysis methods and various analyzers.

First, by analyzing the plurality of first anode active material particles using the Raman spectroscopy or the like, it is determined whether or not the plurality of first anode active material particles contain a carbon-based material, and by analyzing the plurality of second anode active material particles using the Raman spectroscopy or the like, it is determined whether or not the plurality of second anode active material particles contain a carbon-based material. In particular, the graphite can be identified by using the Raman spectroscopy.

Second, the R value is obtained by analyzing the plurality of first anode active material particles using the Raman spectroscopy, and the median diameter D50 is obtained by analyzing the plurality of first anode active material particles using a particle size distribution meter.

Third, the R value is obtained by analyzing the plurality of second anode active material particles using the Raman spectroscopy, and the median diameter D50 is obtained by analyzing the plurality of second anode active material particles using the particle size distribution meter.

Fourth, the mixing ratio is obtained by measuring each of the weight of the plurality of first anode active material particles and the weight of the plurality of second anode active material particles.

The first anode binder contains one or both of styrene-butadiene rubber and a derivative thereof. That is, the first anode binder may contain only styrene-butadiene rubber, may contain only a derivative of the styrene-butadiene rubber, or may contain both thereof. However, the type of derivatives of the styrene-butadiene rubber may be one or two or more.

The derivative of the styrene-butadiene rubber is a compound in which one or more of groups (derivative groups) are introduced into the styrene-butadiene rubber. The type, number, introduction place, and the like of the derivative groups are not particularly limited as long as they do not significantly affect physical properties and the like inherent to the styrene-butadiene rubber. Specifically, the derivative group may be, for example, a saturated hydrocarbon group or an unsaturated hydrocarbon group, and may a group containing, as a constituent element, one or more of non-carbon elements such as oxygen, nitrogen, and sulfur together with carbon and hydrogen, and may be other groups.

The second anode binder contains one or both of polyvinylidene fluoride and a derivative thereof. That is, the second anode binder may contain only polyvinylidene fluoride, may contain only a derivative of the polyvinylidene fluoride, or may contain both thereof. However, the type of derivatives of the styrene-butadiene rubber may be one or two or more.

The details of the derivative of the polyvinylidene fluoride are the same as those of the derivative of the styrene-butadiene rubber described above except that one or more of the derivative groups are introduced into the polyvinylidene fluoride instead of the styrene-butadiene rubber.

For the anode (two types of anode binders) currently used for the secondary battery, the procedure which specifies the above-described material is as follows, for example.

First, after the anode is recovered by disassembling the secondary battery in a fully discharged state, the anode current collector 1 is peeled off from the anode active material layer 2. Thereafter, by analyzing the surface of the anode active material layer 2 using infrared spectroscopy or the like, two types (materials) of anode binders (the first anode binder and the second anode binder) included in the anode active material layer 2 is specified.

Here, the reason why the anode includes two types of anode active materials (the plurality of first anode active material particles and the plurality of second anode active material particles) and two types of anode binders (the first anode binder and the second anode binder), and the above-described conditions for materials, physical properties, dimensions, and mixing ratios of the plurality of first anode active material particles, the plurality of second anode active material particles, the first anode binder, and the second anode binder are satisfied is that the high energy density can be obtained and the anode is likely to significantly occlude and release the electrode reactant for the reasons explained below.

Specifically, first, the plurality of first anode active material particles having a relatively high R value and a relatively small median diameter D50 essentially have a property of easily occluding and releasing the electrode reactant. As a result, the anode containing the plurality of first anode active material particles is likely to occlude and release the electrode reactant. In addition, the plurality of first anode active material particles have the property of being crushed at the time of production of the anode described later (at the time of compression molding). Thereby, in the plurality of first anode active material particles, since the orientation of the carbon-based material is suppressed, the anode is more likely to occlude and release the electrode reactant, and gaps are likely to be formed between the plurality of first anode active material particles, so an electrolytic solution is likely to be impregnated into the anode.

Second, in the plurality of second anode active material particles having a relatively low R value and a relatively large median diameter D50, the crystallinity of the carbon-based material becomes high. Thereby, the energy density of the anode is improved. On the other hand, the plurality of second anode active material particles have the property of being easily crushed at the time of production of the anode described above. As a result, the orientation of the carbon-based material is hardly suppressed, and therefore the anode hardly occludes and releases the electrode reactant and the gaps are hardly formed between the plurality of first anode active material particles, such that it is difficult to impregnate the electrolytic solution into the anode.

Third, by using the first anode binder (styrene-butadiene rubber) and the second anode binder (polyvinylidene fluoride) in combination, the orientation of the carbon-based material is specifically suppressed in each of the plurality of first anode active material particles and the plurality of second anode active materials, such that the anode is more likely to occlude and release the electrode reactant. This is because a film resulting from each of the styrene-butadiene and the polyvinylidene fluoride is formed so as to uniformly cover the surface of the carbon-based material. Thereby, the mechanical strength of each of the plurality of first anode active material particles and the plurality of second anode active material particles is improved, and each of the plurality of first anode active material particles and the plurality of second anode active material particles described above is less likely to be crushed. The advantages described herein can be obtained similarly even when the first anode binder (derivative of the styrene-butadiene rubber) and the second anode binder (derivative of the polyvinylidene fluoride) are used.

From these viewpoints, by a synergistic action of combining the plurality of first anode active material particles, the plurality of second anode active material particles, the first anode binder, and the second anode binder described above, the orientation of the carbon-based material is improved and the anode is likely to be impregnated with the electrolytic solution. Therefore, the high energy density can be obtained, and the anode is likely to significantly occlude and release the electrode reactant. In this case, in particular, the battery capacity of the secondary battery using the anode is improved by increasing the mixing ratio of the plurality of second anode active material particles.

The anode active material layer 2 may contain one or more of other anode active materials together with the two types of anode active materials (the plurality of first anode active material particles and the plurality of second anode active material particles) described above.

Other anode active materials are, for example, a material containing one or more of metal elements and metalloid elements as constituent elements. This is because the high energy density can be obtained. Hereinafter, a material containing one or more of the metal elements and the metalloid elements as a constituent element is referred to as "metal-based material".

The metal-based material may be any one of a simple substance, an alloy, and a compound, two or more thereof, or a material whose at least a part has one or more phases thereof. However, the alloy contains a material including one or more of metal elements and one or more of metalloid elements, in addition to a material containing two or more of metal elements. In addition, the alloy may also contain the nonmetallic elements. The structure of this metal-based material is, for example, a solid solution, a eutectic (eutectic mixture), an intermetallic compound, and a coexistent product of two or more thereof, and the like.

The metal element and the metalloid element described above are, for example, one or more of metal elements and metalloid elements which can form an alloy with the electrode reactant. Specifically, examples thereof include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), platinum (Pt) and the like.

Among them, one or both of silicon and tin are preferable. The reason is that since the ability to occlude and release the electrode reactant is excellent, a significantly high energy density can be obtained.

The material containing one or both of silicon and tin as a constituent element may be any of silicon alone and an alloy and a compound of the silicon, or any of tin alone and an alloy and a compound of the tin, two or more thereof, and a material whose at least a part has one or two or more phases thereof. The simple substance described herein means a simple substance (which may contain a trace amount of impurities) in a general sense, and does not necessarily mean 100% purity.

Examples of the alloy of silicon contain one or more of tin, nickel, copper, iron, cobalt, manganese, zinc, indium, silver, titanium, germanium, bismuth, antimony, chromium and the like as constituent elements other than silicon. Examples of the compound of silicon contain one or more of carbon, oxygen and the like as a constituent element other than silicon. In addition, examples of the compound of silicon may contain one or more of a series of elements described for the alloy of silicon as a constituent element other than silicon.

Specific examples of the alloy of silicon and the compound of silicon contain $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$, ($0<v\leq2$), $LiSiO$, and the like. In $SiO_v$, $0.2<v<1.4$ may be applied.

Examples of the alloy of tin contain one or more of silicon, nickel, copper, iron, cobalt, manganese, zinc, indium, silver, titanium, germanium, bismuth, antimony, chromium and the like as constituent elements other than tin.

Examples of the compound of tin contain one or more of carbon, oxygen and the like as a constituent element other than tin. In addition, examples of the compound of tin may contain one or more of a series of elements described for the alloy of silicon as a constituent element other than tin.

Specific examples of the alloy of tin and the compound of tin are $SnO_w$ ($0<w\leq2$), $SnSiO_3$, $LiSnO$, and $Mg_2Sn$ and the like.

In particular, the material containing tin as a constituent element is preferably, for example, a material (Sn-containing material) containing a second constituent element and a third constituent element together with tin which is a first constituent element. Examples of the second constituent element include one or more of cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, silicon and the like. Examples of the third constituent element contain one or more of boron, carbon, aluminum, phosphorus and the like.

Among them, the Sn-containing material is preferably a material (SnCoC-containing material) containing tin, cobalt, and carbon as a constituent element. In this SnCoC-containing material, for example, the content of carbon is 9.9% by mass to 29.7% by mass, and a content ratio (Co/(Sn+Co)) of tin and cobalt is 20% by mass to 70% by mass. This is because the high energy density can be obtained.

The SnCoC-containing material has a phase containing tin, cobalt, and carbon, and the phase is preferably low crystalline or amorphous. Since this phase is a reaction phase capable of reacting with the electrode reactant, excellent properties are obtained due to the presence of the reaction phase. A half-value width (diffraction angle 2θ) of a diffraction peak of this reaction phase obtained by the X-ray diffraction is preferably 1° or more when a CuKα ray is used as the specific X-ray and a drawing speed is 1°/min. This is because the electrode reactant is occluded and released more smoothly and the reactivity with the electrolytic solution is reduced. In addition to the low crystalline or amorphous phase, the SnCoC-containing material may include a phase containing a simple substance or a part of each constituent element.

It can be easily determined whether the diffraction peak obtained by the X-ray diffraction corresponds to the reaction phase capable of reacting with the electrode reactant by comparing the X-ray diffraction charts before and after the electrochemical reaction with the electrode reactant. For example, if the position of the diffraction peak is changed before and after the electrochemical reaction with the electrode reactant, the SnCoC-containing material corresponds to the reaction phase capable of reacting with the electrode reactant. In this case, for example, the diffraction peak of the low crystalline or amorphous reaction phase is observed between $2\theta=20°$ and $50°$. Such a reaction phase contains, for example, the above-described constituent elements, and is considered to be in low-crystallization or amorphous state mainly due to the presence of carbon.

In the SnCoC-containing material, it is preferable that at least a part of carbon which is a constituent element is bonded to a metal element or a metalloid element which is another constituent element. This is because aggregation or crystallization of tin or the like is suppressed. The bonded state of elements can be confirmed by using, for example, X-ray photoelectron spectroscopy (XPS). In a commercially available apparatus, for example, Al-K$\alpha$ rays, Mg-K$\alpha$ rays or the like are used as soft X-rays. When at least a part of carbon is bonded to a metal element or a metalloid element or the like, a peak of a synthetic wave of 1s orbital of carbon (C1s) appears in a region lower than 284.5 eV. It is assumed that energy is calibrated so that a peak of 4f orbital of a gold atom (Au 4f) is obtained at 84.0 eV. In this case, since surface contamination carbon normally exists in a substance surface, a peak of C1s of the surface contamination carbon is set to be 284.8 eV, and the peak is set as an energy reference. In the XPS measurement, a waveform of the peak of the C1s is obtained in a form including the peak of the surface contamination carbon and the peak of the carbon in the SnCoC-containing material. Therefore, for example, both peaks are separated by analysis using commercially available software. In the analysis of the waveform, a position of a main peak existing on a lowest binding energy side is set to be an energy reference (284.8 eV).

The SnCoC-containing material is not limited to a material (SnCoC) whose constituent elements are only tin, cobalt and carbon. Examples of the SnCoC-containing material include, as a constituent element, one or more of silicon, iron, nickel, chromium, indium, niobium, germanium, titanium, molybdenum, aluminum, phosphorus, gallium, and bismuth and the like, in addition to tin, cobalt, and carbon.

In addition to the SnCoC-containing materials, materials (SnCoFeC-containing materials) containing tin, cobalt, iron, and carbon as a constituent element are also preferable. The composition of this SnCoFeC-containing material is optional. As an example, when the content of iron is set to be small, the content of carbon is 9.9% by mass to 29.7% by mass, the content of iron is 0.3% by mass to 5.9% by mass, and a ratio (Co/(Sn+Co)) of the content of tin and cobalt is 30% by mass to 70% by mass. In addition, when the content of iron is set to be large, the content of carbon is 11.9% by mass to 29.7% by mass, the ratio ((Co+Fe)/(Sn+Co+Fe)) of the content of tin, cobalt, and iron is 26.4% by mass to 48.5% by mass, and the ratio (Co/(Co+Fe)) of the content of cobalt and iron is 9.9% by mass to 79.5% by mass. This is because the high energy density can be obtained in the composition range. The physical properties (half-value width and the like) of the SnCoFeC-containing material are the same as the physical properties of the SnCoC-containing material described above.

In addition, examples of the anode material may include one or more of metal oxides, polymer compounds, and the like. Examples of the metal oxide include iron oxide, ruthenium oxide, and molybdenum oxide and the like. Examples of the polymer compound include polyacetylene, polyaniline, and polypyrrole and the like.

The anode active material layer 2 may contain one or more of other anode binders together with the two types of anode active materials (the plurality of first anode active material particles and the plurality of second anode active material particles) described above.

Examples of other anode binders may include one or more of synthetic rubber, polymer compounds, and the like. However, the above-described styrene-butadiene rubber and a derivative thereof are excluded from the synthetic rubber described herein, and the above-described polyvinylidene fluoride and a derivative thereof are excluded from the polymer compound described herein.

Examples of the synthetic rubber include fluorine-based rubber, ethylene propylene diene, and the like. Examples of the polymer compound include carboxymethyl cellulose, polyacrylic acid, polymethacrylate, polyamide, polyimide, and the like. Examples of the polymethacrylate include polymethyl methacrylate and polyethyl methacrylate.

The anode conductive agent contains, for example, one or more of carbon materials and the like. Examples of the carbon material include graphite, carbon black, fibrous carbon or the like, and examples of the carbon black include acetylene black, ketjen black or the like. However, the anode conductive agent may be a metal material, a conductive polymer, or the like as long as it is a material having conductivity.

The anode active material layer 2 is formed by, for example, one or more of a coating method, a vapor phase method, a liquid phase method, a thermal spraying method, a firing method (sintering method) and the like.

The coating method is, for example, a method of preparing a solution in which a mixture of a plurality of particulate (powdery) anode active materials and an anode binder or the like is dispersed or dissolved by an organic solvent or the like and then coating the solution to the anode current collector 1.

Examples of the vapor phase method include a physical deposition method, a chemical deposition method or the like. More specifically, examples of the vapor phase method include a vacuum deposition method, a sputtering method, an ion plating method, a laser ablation method, a thermal chemical vapor deposition method, a chemical vapor deposition (CVD) method, plasma chemical vapor deposition, or the like.

Examples of the vapor phase method include an electroplating method, an electroless plating method or the like. The thermal spraying method is a method of spraying a molten or semi-molten anode active material onto the surface of the anode current collector 1.

Examples of the firing method include a method of coating a solution to an anode current collector 1 using the coating method and then heat-treating a coating film at a temperature higher than a melting point of an anode binder and the like. Examples of the firing method include an atmosphere firing method, a reaction firing method, a hot press firing method, or the like.

The anode is manufactured, for example, by the procedure described below.

The materials of each of the first anode active material particles, the second anode active material particles, the first anode binder, and the second anode binder have already been described in detail, and therefore, the description thereof will be frequently omitted below.

When the anode is manufactured, first, two types of anode active materials (the plurality of first anode active material particles and the plurality of second anode active material particles) and two types of anode binders (the first anode binder and the second anode binder) and, if necessary, the anode conductive agent and the like are mixed to form an anode mixture. Next, the anode mixture is dissolved or dispersed in a solvent to form a paste-like anode mixture slurry. Finally, the anode mixture slurry is applied to both surfaces of the anode current collector 1, and then the anode mixture slurry is dried to form the anode active material layer 2. Hereinafter, the anode active material layer 2 may be compression molded using a roll press or the like, as necessary. In this case, the compression molding may be performed while the anode active material layer 2 is heated, or the compression molding may be repeated multiple times.

As a result, the anode active material layer 2 is formed on the anode current collector 1, such that the anode is completed.

This anode includes two types of anode active materials (the plurality of first anode active material particles and the plurality of second anode active material particles) and two types of anode binders (the first anode binder and the second anode binder), and the above-described conditions for materials, physical properties, dimensions, and mixing ratios of two types of anode active materials and two types of anode binders, respectively, are satisfied. In this case, as described above, the high energy density can be obtained, and the electrode reactant is likely to be significantly occluded and released, such that the excellent battery characteristics can be obtained.

In particular, if a ratio P relating to the graphite orientation of two types of anode active materials (the plurality of first anode active material particles and the plurality of second anode active material particles) is 36 to 42, the graphite orientation of the two types of anode active materials is optimized, such that higher effects can be obtained.

Next, the secondary battery using the anode according to an embodiment of the present technology described above will be described.

Figure 2:
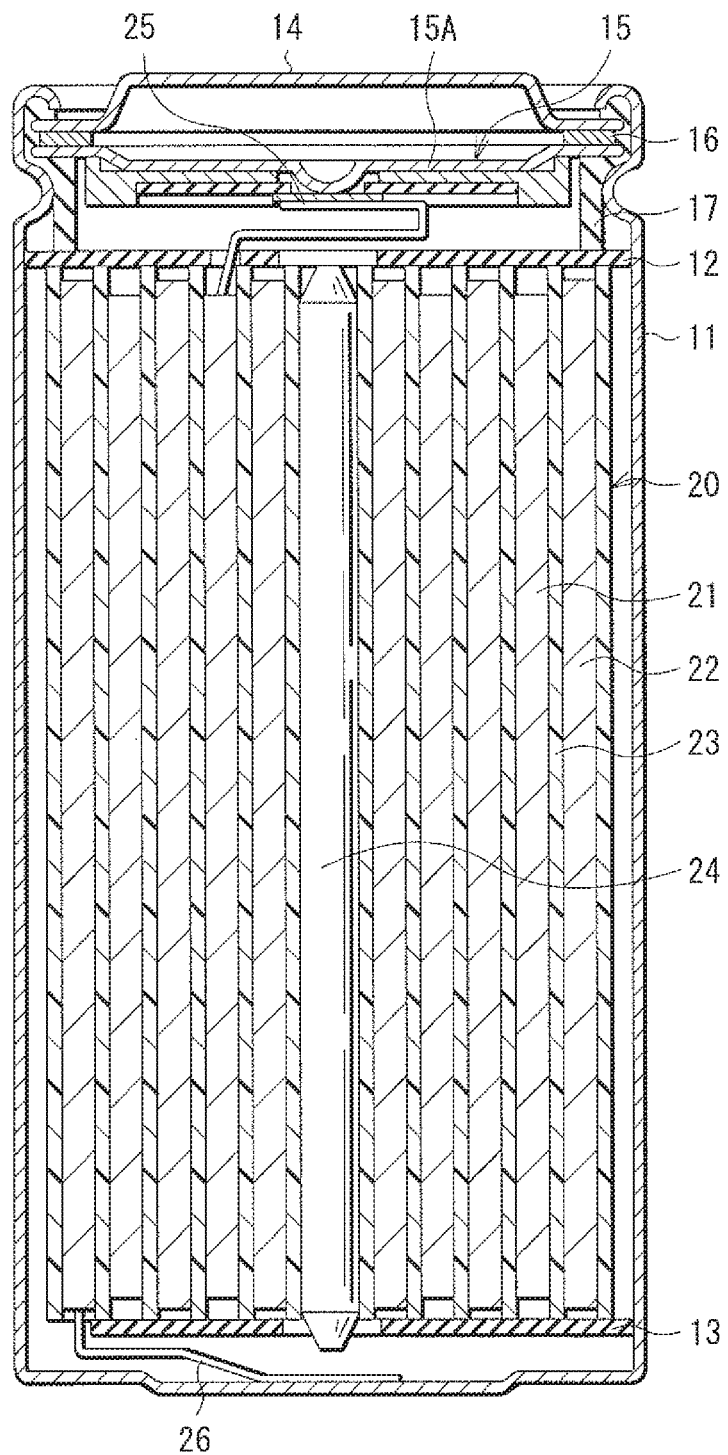
FIG. 2 is a cross-sectional view illustrating a configuration of a secondary battery (cylindrical type) according to an embodiment of the present technology.
Figure 3:
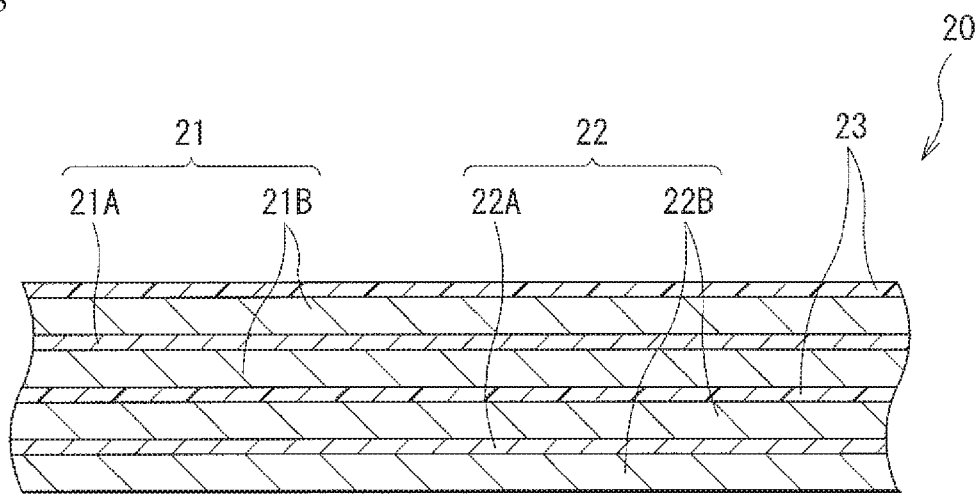
FIG. 3 is a cross-sectional view illustrating a configuration of a part of a wound electrode body shown in FIG. 2.

FIG. 2 illustrates a cross sectional configuration of the secondary battery. FIG. 3 shows a cross sectional configuration of a part of a wound electrode body 20 illustrated in FIG. 2.

The secondary battery described herein is, for example, a lithium ion secondary battery in which the capacity of the anode 22 is obtained by the occlusion and releasing of lithium which is the electrode reactant.

The secondary battery has a cylindrical battery structure. For example, as shown in FIG. 2, this secondary battery includes a pair of insulating plates 12 and 13 and the wound electrode body 20 as a battery element provided inside a hollow cylindrical battery can 11. In the wound electrode body 20, for example, a cathode 21 and an anode 22 which are laminated with a separator 23 interposed therebetween are wound. The wound electrode body 20 is impregnated with, for example, an electrolytic solution which is a liquid electrolyte.

The battery can 11 has, for example, a hollow structure in which one end is closed and the other end is open, and contains, for example, one or more of iron, aluminum, and an alloy thereof. A surface of the battery can 11 may be plated with nickel or the like. The pair of insulating plates 12 and 13 has the wound electrode body 20 interposed therebetween and extend perpendicularly to a winding peripheral surface of the wound electrode body 20.

Since a battery lid 14, a safety valve mechanism 15, and a heat sensitive resistance element (PTC element) 16 are crimped to an open end of the battery can 11 via the gasket 17, the battery can 11 is sealed. However, the heat sensitive resistance element 16 may also be omitted. The battery lid 14 contains, for example, the same material as the battery can 11. Each of the safety valve mechanism 15 and the heat sensitive resistance element 16 are provided inside the battery lid 14, and the safety valve mechanism 15 is electrically connected to the battery lid 14 with the heat sensitive resistance element 16 interposed therebetween. In this safety valve mechanism 15, the disc plate 15A is reversed when the internal pressure exceeds a certain level due to internal short circuit, external heating, or the like, so the electrical connection between the battery lid 14 and the wound electrode body 20 is cut off. In order to prevent abnormal heat generation caused by a large current, the electrical resistance of the heat sensitive resistance element 16 increases as the temperature rises. The gasket 17 contains, for example, an insulating material, and the surface of the gasket 17 may be coated with asphalt or the like.

For example, a center pin 24 is inserted into a space generated at a winding center of the wound electrode body 20. However, the center pin 24 may also be omitted. A cathode lead 25 is connected to the cathode 21, and an anode lead 26 is connected to the anode 22. The cathode lead 25 contains, for example, a conductive material such as aluminum. The cathode lead 25 is, for example, connected to the safety valve mechanism 15 and electrically conducted to the battery lid 14. The anode lead 26 contains, for example, a conductive material such as nickel. The anode lead 26 is, for example, connected to the battery can 11, and electrically conducted to the battery can 11.

For example, as illustrated in FIG. 3, the cathode 21 includes a cathode current collector 21A and a cathode active material layer 13B provided on the cathode current collector 21A.

The cathode active material layer 21B may be provided only on one surface of the cathode current collector 21A or may be provided on both surfaces of the cathode current collector 21A. FIG. 3 illustrates, for example, a case where the cathode active material layer 21B is provided on both surfaces of the cathode current collector 21A.

The cathode current collector 21A contains, for example, one or more of conductive materials. The type of conductive material is not particularly limited, but is, for example, metal materials such as aluminum, nickel and stainless steel. The metal material is not limited to metal alone but may be an alloy. The anode current collector 21A may be a single layer or a multilayer.

The cathode active material layer 21B contains, as a cathode active material, one or more of cathode materials capable of occluding and releasing lithium. However, the cathode active material layer 21B may further contain one or more of other materials such as a cathode binder and a cathode conductive agent.

The cathode material is preferably one or more of lithium-containing compounds. The type of the lithium-containing compound is not particularly limited, but among them, lithium-containing composite oxides and lithium-containing phosphate compounds are preferable. This is because the high energy density can be obtained.

The "lithium-containing composite oxide" is an oxide containing one or more of lithium and other elements as a constituent element. This "other elements" are elements other than lithium. The lithium-containing oxide has, for example, a crystal structure of one or more of a layered rock salt type, a spinel type, and the like.

The "lithium-containing phosphate compound" is a phosphate compound containing one or more of lithium and other elements as a constituent element. The lithium-containing phosphate compound has, for example, a crystal structure of one or more of an olivine type.

The type of other elements is not particularly limited as long as it is any one type or two or more types of arbitrary elements (except lithium). Among them, it is preferable that other elements are one or more of elements belonging to Groups 2 to 15 in a long-periodic table. More specifically, other element is more preferably one or more metal elements of nickel, cobalt, manganese, iron and the like. This is because the high voltage can be obtained.

The lithium-containing composite oxide having a layered rock salt type crystal structure is, for example, a compound represented by each of the following Formulas (1) to (3), or the like.

$$Li_aMn_{(1-b-c)}Ni_bM1_cO_{(2-d)}F_e \quad (1)$$

(M1 is at least one type of cobalt, magnesium, aluminum, boron, titanium, vanadium, chromium, iron, copper, zinc, zirconium, molybdenum, tin, calcium, strontium, and tungsten; a to e satisfy $0.8 \le a \le 1.2$, $0 < b < 0.5$, $0 \le c \le 0.5$, $(b+c) < 1$, $-0.1 \le d \le 0.2$ and $0 \le e \le 0.1$; however, the composition of lithium differs depending on a state of charge and discharge, and a is a value of the completely discharged state.)

$$Li_aNi_{(1-b)}M2_bO_{(2-c)}F_d \quad (2)$$

(M2 is at least one type of cobalt, manganese, magnesium, aluminum, boron, titanium, vanadium, chromium, iron, copper, zinc, molybdenum, tin, calcium, strontium, and tungsten; a to d satisfy $0.8 \le a \le 1.2$, $0.005 \le b \le 0.5$, $-0.1 \le c \le 0.2$, and $0 \le d \le 0.1$; however, the composition of lithium differs depending on a state of charge and discharge, and a is a value of the completely discharged state.)

$$Li_aCo_{(1-b)}M3_bO_{(2-c)}F_d \quad (3)$$

(M3 is at least one type of nickel, manganese, magnesium, aluminum, boron, titanium, vanadium, chromium, iron, copper, zinc, molybdenum, tin, calcium, strontium, and tungsten; a to d satisfy $0.8 \le a \le 1.2$, $0 \le b < 0.5$, $-0.1 \le c \le 0.2$, and $0 \le d \le 0.1$; however, the composition of lithium differs depending on a state of charge and discharge, and a is a value of the completely discharged state.)

Examples of the lithium-containing composite oxide having the layered rock salt type crystal structure include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, $Li_{1.15}(Mn_{0.65}Ni_{0.22}Co_{0.13})O_2$, or the like.

When the lithium-containing composite oxide having the layered rock salt type crystal structure contains nickel, cobalt, manganese, and aluminum as a constituent element, an atomic ratio of nickel is preferably 50 atomic % or more. This is because the high energy density can be obtained.

The lithium-containing composite oxide having the spinel type crystal structure is, for example, a compound represented by the following Formula (4), or the like.

$$Li_aMn_{(2-b)}M4_bO_cF_d \quad (4)$$

(M4 is at least one type of cobalt, nickel, magnesium, aluminum, boron, titanium, vanadium, chromium, iron, copper, zinc, molybdenum, tin, calcium, strontium, and tungsten; a to d satisfy $0.9 \le a \le 1.1$, $0 \le b \le 0.6$, $3.7 \le c \le 4.1$, and $0 \le d \le 0.1$; however, the composition of lithium differs depending on a state of charge and discharge, and a is a value of the completely discharged state.)

Examples of the lithium-containing composite oxide having the spinel type crystal structure include $LiMn_2O_4$ or the like.

The lithium-containing phosphate compound having the olivine type crystal structure is, for example, a compound represented by the following Formula (5), or the like.

$$Li_aM5PO_4 \quad (5)$$

(M5 is at least one type of cobalt, manganese, iron, nickel, magnesium, aluminum, boron, titanium, vanadium, niobium, copper, zinc, molybdenum, calcium, strontium, tungsten, and zirconium; a satisfies $0.9 \le a \le 1.1$; however, the composition of lithium differs depending on a state of charge and discharge, and a is a value of the completely discharged state.)

Examples of the lithium-containing phosphate compound having the olivine type crystal structure include $LiFePO_4$, $LiMnPO_4$, $LiFe_{0.5}Mn_{0.5}PO_4$, $LiFe_{0.3}Mn_{0.7}PO_4$ or the like.

The lithium-containing composite oxide may be a compound represented by following Formula (6) or the like.

$$(Li_2MnO_3)_x(LiMnO_2)_{1-x} \quad (6)$$

where x satisfies $0 \le x \le 1$.

In addition, examples of the cathode material may include, for example, an oxide, a disulfide, a chalcogenide, and a conductive polymer. Examples of the oxide include titanium oxide, vanadium oxide, and manganese dioxide. Examples of the disulfide include titanium disulfide and molybdenum sulfide. The chalcogenide is, for example, niobium selenide or the like. Examples of the conductive polymer include sulfur, polyaniline, and polythiophene.

The cathode binder contains, for example, one or more of synthetic rubber, polymer compound and the like. Examples of the synthetic rubber include styrene-butadiene rubber, fluorine rubber, and ethylene propylene diene or the like. Examples of the polymer compound include polyvinylidene fluoride, carboxymethyl cellulose, polyacrylic acid, and polyimide.

The details of the cathode conductive agent are, for example, the same as the details of the anode conductive agent described above.

The anode 22 has, for example, the same configuration as the anode according to the embodiment of the present technology described above. That is, as illustrated in FIG. 3, the anode 22 includes an anode current collector 21A and an anode active material layer 21B provided on the anode current collector 21A. The configurations of each of the anode current collector 21A and the anode active material layer 21B are the same as the configurations of each of the anode current collector 1 and the anode active material layer 2.

However, the chargeable capacity of the anode active material is preferably larger than the discharge capacity of the cathode 21 in order to prevent lithium from being unintentionally precipitated on the surface of the anode 22 during the charging. That is, an electrochemical equivalent of the anode active material capable of occluding and releasing lithium is preferably larger than that of the cathode 21.

For example, as described above, in order to prevent lithium from being unintentionally precipitated on the surface of the anode 22 during charging, the electrochemical equivalent of the anode active material capable of occluding and releasing the lithium is preferably larger than that of the cathode 21. In addition, if an open circuit voltage (that is, a battery voltage) at the time of full charge is 4.25 V or more, compared to the case of 4.20 V, the amount of lithium released per unit mass is large even if the same cathode active material is used, and therefore the amount of cathode active material and the amount of anode active material are preferably adjusted accordingly. This is because the high energy density can be obtained.

The separator 23 is disposed between the cathode 21 and the anode 22. As a result, the separator 23 separates the cathode 21 and the anode 22 and passes lithium ions while preventing a short circuit of current caused by the contact between the cathode 21 and the anode 22.

The separator 23 contains, for example, one or more of porous films such as synthetic resin and ceramic, and may also be a laminated film of two or more types of porous films. Examples of the synthetic resin include polytetrafluoroethylene, polypropylene, and polyethylene.

Examples of the separator 23 may include the above-described porous film (base material layer) and a polymer compound layer provided on the base material layer. The reason is that since the adhesion of the separator 23 to each of the cathode 21 and the anode 22 is improved, the wound electrode body 20 is hardly distorted. Thereby, the decomposition reaction of the electrolytic solution is suppressed, and the leakage of the electrolytic solution impregnated into the base material layer is also suppressed, such that the electric resistance is hardly increased even if charge and discharge are repeated, and the secondary battery is hardly swollen.

The polymer compound layer may be provided only on one surface of the base material layer, or may be provided on both surfaces of the base material layer. The polymer compound layer contains, for example, one or more of polymer materials such as polyvinylidene fluoride. This is because the polyvinylidene fluoride is excellent in physical strength and electrochemically stable. In the case of forming a polymer compound layer, for example, a solution in which a polymer material is dissolved with an organic solvent or the like is coated onto a base material layer, and then the base material layer is dried. After the base material layer is immersed in a solution, the base material layer may be dried.

The electrolytic solution contains, for example, one or more of solvents and one or more of electrolyte salts. The electrolytic solution may further contain one or more of various materials such as additives.

The solvent contains a non-aqueous solvent such as an organic solvent. The electrolytic solution containing the non-aqueous solvent is a so-called non-aqueous electrolytic solution.

Specifically, examples of the solvent include cyclic carbonate, chain carbonate, lactone, chain carboxylate, nitrile (mononitrile) and the like. This is because excellent battery capacity, cycle characteristics, and storage characteristics can be obtained.

Examples of the cyclic carbonate include ethylene carbonate, propylene carbonate, and butylene carbonate. Examples of the chain carbonate include dimethyl carbonate, diethyl carbonate, ethyl methyl carbonate, methyl propyl carbonate, and the like. Examples of the lactone include γ-butyrolactone, γ-valerolactone, and the like. Examples of the chain carboxylate include methyl acetate, ethyl acetate, methyl propionate, ethyl propionate, propyl propionate, methyl butyrate, methyl isobutyrate, methyl trimethylacetate, ethyl trimethylacetate and the like. Examples of the nitrile include acetonitrile, methoxyacetonitrile, 3-methoxypropionitrile and the like.

In addition, examples of the solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N, N'-dimethylimidazolidinone, nitromethane, nitroethane, sulfolane, trimethyl phosphate, dimethyl sulfoxide and the like. This is because the same advantage is obtained.

Among them, one or more of carbonates such as ethylene carbonate, propylene carbonate, dimethyl carbonate, diethyl carbonate, and ethyl methyl carbonate are preferable. This is because more excellent battery capacity, cycle characteristics, and storage characteristics can be obtained.

In this case, a combination of a high viscosity (high dielectric constant) solvent (for example, relative permittivity $\varepsilon \geq 30$) which is a cyclic carbonate such as ethylene carbonate and propylene carbonate, and a low viscosity solvent (for example, viscosity≤1 mPa·s) which is a chain carbonate such as dimethyl carbonate, ethyl methyl carbonate, and diethyl carbonate is preferable. This is because the dissociation of the electrolyte salt and the mobility of ions are improved.

In addition, the solvent may be unsaturated cyclic carbonate, halogenated carbonate, sulfonate, acid anhydride, a dinitrile compound, a diisocyanate compound, and the like. This is because the chemical stability of the electrolytic solution is improved, and the decomposition reaction of the electrolytic solution and the like is suppressed.

The unsaturated cyclic carbonate is a cyclic carbonate having one or more unsaturated bonds (carbon-carbon double bonds). Examples of the unsaturated cyclic carbonate include vinylene carbonate (1,3-dioxol-2-one), vinylethylene carbonate (4-vinyl-1,3-dioxolan-2-one), and methyleneethylene carbonate (4-methylene-1,3-dioxolan-2-one) and the like. The content of the unsaturated cyclic carbonate in the solvent is not particularly limited, and is, for example, 0.01% by weight to 10% by weight.

The halogenated carbonate is a cyclic or chain carbonate containing one or more halogens as a constituent element. The type of halogen is not particularly limited, and is, for example, one or more of fluorine, chlorine, bromine, iodine, and the like. Examples of the cyclic halogenated carbonate include 4-fluoro-1,3-dioxolan-2-one, 4,5-difluoro-1,3-dioxolan-2-one, and the like. Examples of the chain halogenated carbonate include fluoromethyl methyl carbonate, bis(fluoromethyl) carbonate, and difluoromethyl methyl carbonate. The content of the halogenated carbonate in the solvent is not particularly limited, and is, for example, 0.01% by weight to 50% by weight.

Examples of the sulfonate are, for example, monosulfonate, disulfonate, and the like. The monosulfonate may be cyclic monosulfonate or a chain monosulfonate. Examples of the cyclic monosulfonate include sultones such as 1,3-propane sultone and 1,3-propene sultone. The chain monosulfonate is, for example, a compound in which a cyclic monosulfonate is cut halfway. The disulfonate may be cyclic disulfonate or chain-like disulfonate. The content of the sulfonate in the solvent is not particularly limited, but is, for example, 0.5% by weight to 5% by weight.

Examples of the acid anhydride include carboxylic acid anhydride, disulfonic acid anhydride and carboxylic acid sulfonic acid anhydride. Examples of the carboxylic acid anhydride include succinic anhydride, glutaric anhydride and maleic anhydride. Examples of the disulfonic anhydride include anhydrous ethanedisulfonic acid, anhydrous propanedisulfonic acid, and the like. Examples of the carboxylic acid sulfonic acid anhydride include sulfobenzoic anhydride, sulfopropionic anhydride, sulfobutyric anhydride, and the like. The content of the acid anhydride in the solvent is not particularly limited, but is, for example, 0.5% by weight to 5% by weight.

The dinitrile compound is, for example, a compound represented by NC—$C_mH_{2m}$—CN (m is an integer of 1 or more) Examples of the dinitrile compound include succinonitrile (NC—$C_2H_4$—CN), glutaronitrile (NC—$C_3H_6$—CN), adiponitrile (NC—$C_4H_8$—CN), phthalonitrile (NC—$C_6H_4$—CN) and the like. The content of the dinitrile compound in the solvent is not particularly limited, but is, for example, 0.5% by weight to 5% by weight.

The diisocyanate compound is, for example, a compound represented by OCN—$C_nH_2$—NCO (n is an integer of 1 or more). The diisocyanate compound is, for example, OCN—$C_6H_{12}$—NCO. The content of the diisocyanate compound in the solvent is not particularly limited, but is, for example, 0.5% by weight to 5% by weight.

The electrolyte salt contains, for example, one or more of lithium salts. However, the electrolyte salt may contain, for example, salt other than the lithium salt. The salt other than lithium is, for example, light metal salt other than lithium.

Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate (LiB $(C_6H_5)_4$), lithium methane sulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl), lithium bromide (LiBr) and the like. This is because excellent battery capacity, cycle characteristics, and storage characteristics can be obtained.

Among them, one or more of lithium hexafluorophosphate, lithium tetrafluoroborate, lithium perchlorate and lithium hexafluoroarsenate are preferable, and lithium hexafluorophosphate is more preferable. This is because the internal resistance is reduced, and thus a higher effect can be obtained.

The content of the electrolyte salt is not particularly limited, but preferably 0.3 mol/kg to 3.0 mol/kg with respect to the solvent. This is because the high ion conductivity can be obtained.

The secondary battery operates, for example, as follows. At the time of charging, lithium ions are released from the cathode 21 and the lithium ions are occluded into the anode 22 through the electrolytic solution. On the other hand, at the time of discharging, lithium ions are released from the anode 22 and the lithium ions are occluded into the cathode 21 through the electrolytic solution.

The secondary battery is manufactured, for example, by the following procedure.

In the case of manufacturing the cathode 21, first, the cathode active material, the cathode binder, the cathode conductive agent, and the like are mixed to form the cathode mixture. Subsequently, the cathode mixture is dispersed in an organic solvent or the like to form a paste-like cathode mixture slurry. Finally, the cathode mixture slurry is coated on both surfaces of the cathode current collector 21A, and then the cathode mixture slurry is dried to form the cathode active material layer 21B. Thereafter, the cathode active material layer 21B may be compression molded using a roll press machine or the like. In this case, the cathode active material layer 21B may be heated or compression molded plural times.

When the anode 22 is manufactured, the anode active material layer 22B is formed on both surfaces of the anode current collector 22A by the same procedure as the manufacturing procedure of the anode described above.

When the secondary battery is assembled, the cathode lead 25 is connected to the cathode current collector 21A using a welding method or the like, and the anode lead 26 is connected to the anode current collector 22A using a welding method or the like. Subsequently, the cathode 21 and the anode 22 laminated with the separator 23 interposed therebetween are wound to form the wound electrode body 20. Subsequently, the center pin 24 is inserted into the space formed at the winding center of the wound electrode body 20.

Subsequently, the wound electrode body 20 is housed inside the battery can 11 while the wound electrode body 20 is sandwiched by the pair of insulating plates 12 and 13. In this case, the cathode lead 25 is connected to the safety valve mechanism 15 using the welding method or the like, and the anode lead 26 is connected to the battery can 11 using the welding method or the like. Subsequently, the electrolytic solution is injected into the battery can 11 to impregnate the wound electrode body 20 with the electrolytic solution. Finally, the battery lid 14, the safety valve mechanism 15, and the heat sensitive resistance element 16 are caulked to the open end portion of the battery can 11 via the gasket 17. Thereby, the cylindrical secondary battery is completed.

According to this cylindrical secondary battery, since the anode 22 has the same configuration as that of the anode according to the embodiment of the present technology described above, the high energy density can be obtained, and the anode 22 is likely to significantly occlude and release lithium ions. Therefore, excellent battery characteristics can be obtained.

Other actions and effects are the same as those described for the anode of the embodiment of the present technology described above.

Figure 4:
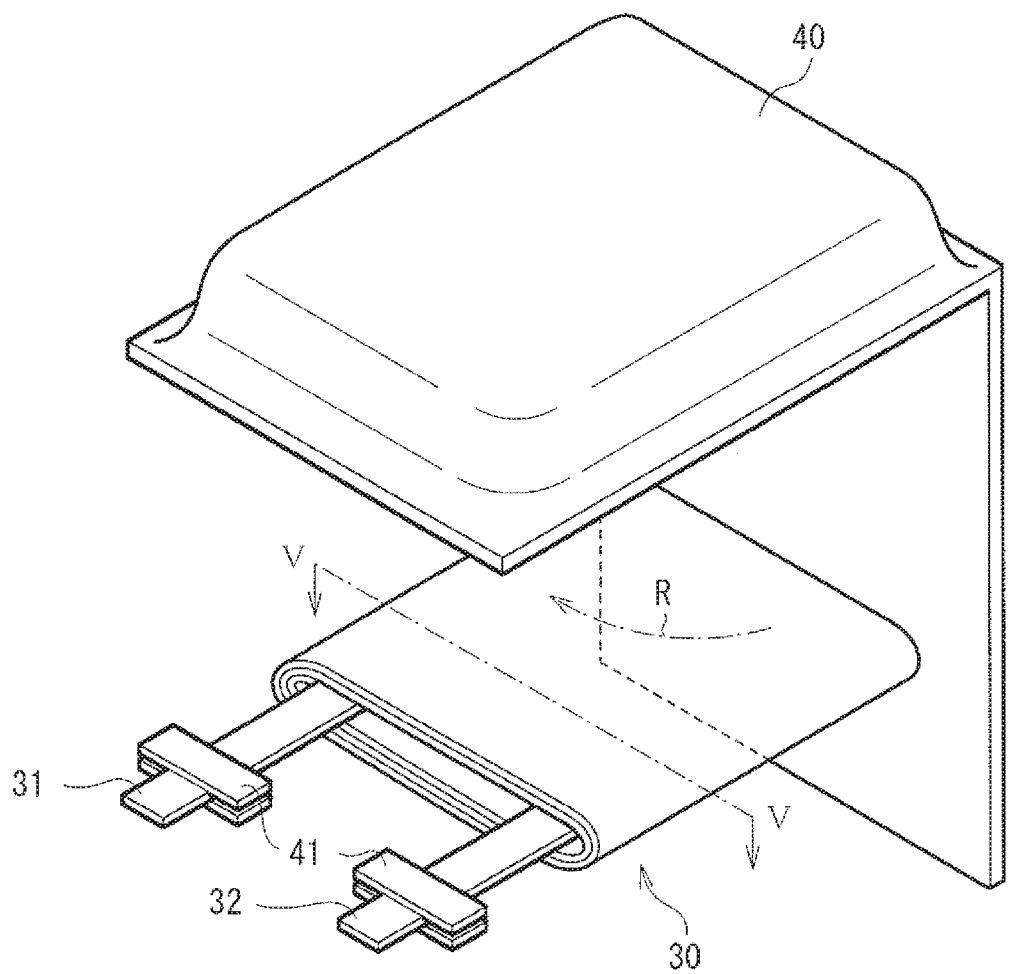
FIG. 4 is a perspective view illustrating a configuration of another secondary battery (laminated film type) according to an embodiment of the present technology.
Figure 5:
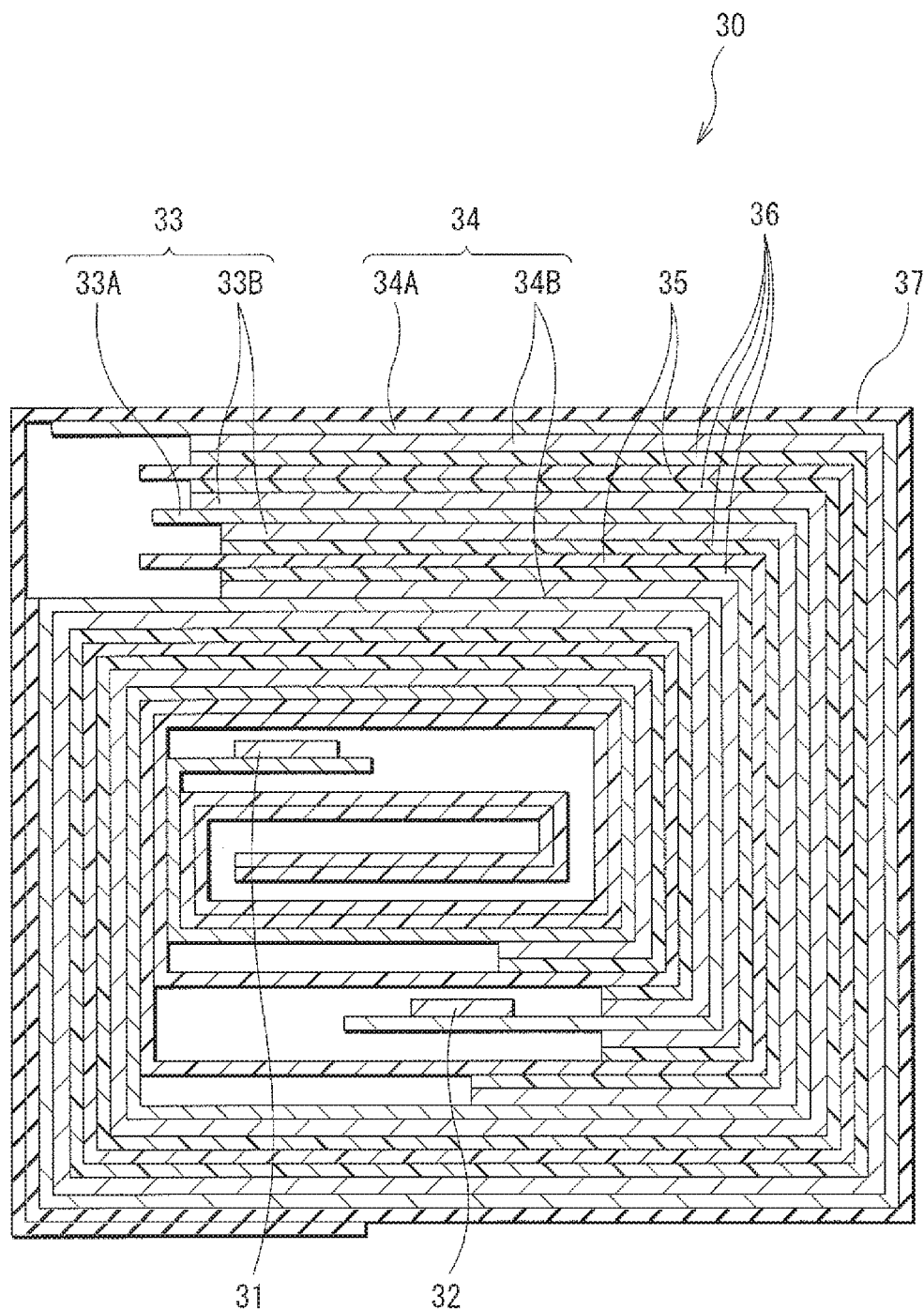
FIG. 5 is a cross-sectional view of the wound electrode body taken along the line V-V shown in FIG. 4.

FIG. 4 illustrates a perspective configuration of another secondary battery. FIG. 5 is a cross-sectional view of a wound electrode body 30 taken along the line V-V illustrated in FIG. 4. FIG. 4 illustrates a state which the wound electrode body 30 and an exterior member 40 spaced apart from each other.

In the following description, the components of the cylindrical secondary battery described above will be referred to as needed.

The secondary battery is a lithium ion secondary battery having a laminated film type battery structure. For example, as illustrated in FIG. 4, the secondary battery includes the wound electrode body 30 as a battery element provided inside a flexible film-like exterior member 40. In the wound electrode body 30, for example, a cathode 33 and an anode 34 are laminated with a separator 35 and an electrolyte layer 36 interposed therebetween, and the laminate is wound. A cathode lead 31 is connected to the cathode 33, and an anode lead 32 is connected to the anode 34. An outermost peripheral portion of the wound electrode body 30 is protected by a protective tape 37.

Each of the cathode lead 31 and the anode lead 32 is, for example, drawn from the inside to the outside of the exterior member 40 in the same direction. The cathode lead 31 contains, for example, one or more of conductive materials such as aluminum. The anode lead 32 contains, for example, one or more of conductive materials such as copper, nickel, and stainless steel. These conductive materials are, for example, a thin plate shape or a mesh shape.

The exterior member 40 is, for example, one film that can be folded in a direction of the arrow R illustrated in FIG. 4, and a part of the exterior member 40 is provided with a recess for housing the wound electrode body 30. The exterior member 40 is, for example, a laminated film in which a fusion layer, a metal layer, and a surface protective layer are laminated in this order. In the manufacturing process of the secondary battery, the exterior member 40 is folded so that the fusion layers are opposed to each other with the wound electrode body 30 therebetween, and the outer peripheral edge portions of the fusion layers are fused. However, the exterior member 40 may be a laminated film of two sheets stuck to each other by an adhesive or the like. The fusion layer contains, for example, one or more of films such as polyethylene and polypropylene. The metal layer contains, for example, one or more of aluminum foil and the like. The surface protective layer contains, for example, one or more of films such as nylon and polyethylene terephthalate.

Among them, the exterior member 40 is preferably an aluminum laminated film in which a polyethylene film, an aluminum foil, and a nylon film are laminated in this order. However, the exterior member 40 may be a laminated film having another laminated structure, a polymer film of polypropylene or the like, or a metal film.

For example, an adhesive film 41 is inserted between the exterior member 40 and the cathode lead 31 in order to prevent penetration of outside air. Further, for example, the above-described adhesive film 41 is inserted between the exterior member 40 and the anode lead 32. The adhesive film 41 contains one or more of materials having adhesiveness to both of the cathode lead 31 and the anode lead 32. The material having the adhesiveness is, for example, a polyolefin resin and the like, and more specifically, polyethylene, polypropylene, modified polyethylene, modified polypropylene, and the like.

The cathode 33 includes, for example, a cathode current collector 33A and a cathode active material layer 33B. The anode 34 includes an anode current collector 34A and an anode active material layer 34B. The configuration of each of the cathode current collector 33A, the cathode active material layer 33B, the anode current collector 34A, and the anode active material layer 34B is, for example, the same as that of each of the cathode current collector 21A, the cathode active material layer 21B, the anode current collector 22A, and the anode active material layer 22B. The configuration of the separator 35 is, for example, the same as that of the separator 23.

The electrolyte layer 36 contains an electrolytic solution and a polymer compound. This electrolytic solution has the same configuration as the electrolytic solution used in the above-described cylindrical secondary battery. The electrolyte layer 36 described herein is a so-called gel-like electrolyte, and in the electrolyte layer 36, an electrolytic solution is held by a polymer compound. This is because high ionic conductivity (for example, 1 mS/cm or more at room temperature) can be obtained, and leakage of the electrolytic solution can be prevented. The electrolyte layer 36 may further contain one or more of other materials such as additives.

The polymer compound contains one or more of homopolymers and copolymers. Examples of the homopolymer include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate. Examples of the copolymer include a copolymer and the like of vinylidene fluoride and hexafluoropyrene. Among them, the homopolymer is preferably polyvinylidene fluoride, and the copolymer is preferably a copolymer of vinylidene fluoride and hexafluoropyrene. The reason is that the homopolymer is electrochemically stable.

In the electrolyte layer 36 which is the gel-like electrolyte layer, the "solvent" included in the electrolytic solution is a broad concept including not only liquid materials but also materials having ion conductivity capable of dissociating an electrolyte salt. Therefore, in the case of using a polymer compound having ion conductivity, the polymer compound is also included in the solvent.

Instead of the gel-like electrolyte layer 36, the electrolytic solution may be used as it is. In this case, the electrolytic solution is impregnated into the wound electrode body 30.

The secondary battery operates, for example, as follows.

During charging, lithium ions are released from the cathode 33 and the lithium ions are occluded into the anode 34 through the electrolyte layer 36. On the other hand, at the time of discharging, lithium ions are released from the anode 34 and the lithium ions are occluded into the cathode 33 through the electrolyte layer 36.

The secondary battery provided with the gel-like electrolyte layer 36 is manufactured, for example, by the following three procedures.

In the first procedure, the cathode 33 and the anode 34 are manufactured by the same manufacturing procedure as the cathode 21 and the anode 22. Specifically, when the cathode 33 is manufactured, a cathode active material layer 33B is formed on both surfaces of the cathode current collector 33A, and when the anode 34 is manufactured, the anode active material layer 34B is formed on both surfaces of the anode current collector 34A.

Subsequently, a precursor solution is prepared by mixing an electrolytic solution, a polymer compound, an organic solvent, and the like. Subsequently, after the precursor solution is coated on the cathode 33, the precursor solution is dried to form the gel-like electrolyte layer 36. In addition, after the precursor solution is coated on the anode 34, the precursor solution is dried to form the gel-like electrolyte layer 36.

Next, the cathode lead 31 is connected to the cathode current collector 33A using a welding method or the like, and the anode lead 32 is connected to the anode current collector 34A using the welding method or the like. Subsequently, the cathode 33 and the anode 34 laminated with the separator 35 and the electrolyte layer 36 interposed therebetween are wound to form the wound electrode body 30. Subsequently, the protective tape 37 is attached to the outermost peripheral portion of the wound electrode body 30. Subsequently, after the exterior member 40 is folded so as to sandwich the wound electrode body 30, the outer peripheral portions of the exterior member 40 are bonded to each other using a heat fusion method to encapsulate the wound electrode body 30 into the exterior member 40. In this case, the adhesive film 41 is inserted between the cathode lead 31 and the exterior member 40, and the adhesive film 41 is inserted between the anode lead 32 and the exterior member 40.

In the second procedure, the cathode lead 31 is connected to the cathode 33 using a welding method or the like, and the anode lead 32 is connected to the anode 34 using the welding method or the like. Subsequently, the cathode 33 and the anode 34 laminated with the separator 35 interposed therebetween are wound to manufacture the wound body which is a precursor of the wound electrode body 30. Subsequently, the protective tape 37 is attached to the outermost peripheral portion of the wound body. Next, after the exterior member 40 is folded so as to sandwich the wound electrode body 30, the remaining outer peripheral edge portion excluding the outer peripheral edge portion of one side in the exterior member 40 is bonded using a heat fusion method or the like, and the wound body is housed inside the bag-like exterior member 40.

Subsequently, the composition for electrolytes is prepared by mixing an electrolytic solution, a monomer which is a raw material of a polymer compound, a polymerization initiator, and other materials, such as a polymerization inhibitor, as needed. Subsequently, after the composition for electrolyte is injected into the bag-like exterior member 40, the exterior member 40 is sealed using the heat fusion method or the like. Subsequently, the monomer is thermally polymerized to form a polymer compound. As a result, the electrolytic solution is held by the polymer compound, such that the gel-like electrolyte layer 36 is formed.

In the third procedure, the wound body is produced by the same procedure as the above-described second procedure except that the separator 35 in which the polymer compound layer is formed in the porous membrane (base material layer) is used, and then the wound body is housed into the bag-like exterior member 40. Subsequently, after the electrolyte is injected into the bag-like exterior member 40, the opening portion of the exterior member 40 is sealed using the heat fusion method or the like. Subsequently, by heating the exterior member 40 while applying a weight to the exterior member 40, the separator 35 is closely attached to the cathode 33 via the polymer compound layer, and the separator 35 is attached to the anode 34 via the polymer compound layer. As a result, the aqueous electrolytic solution is impregnated into the polymer compound, and the polymer compound layer is gelated to form the electrolyte layer 36.

In this third procedure, the secondary battery is less likely to be swollen as compared with the first procedure. Furthermore, in the third procedure, the solvent and the monomer (raw material of the polymer compound) and the like hardly remain in the electrolyte layer 36 as compared with the second procedure, such that the step of forming the polymer compound is well controlled. For this reason, each of the cathode 33, the anode 34, and the separator 35 sufficiently adheres to the electrolyte layer 36.

According to this laminated film type secondary battery, since the anode 34 has the same configuration as that of the anode according to the embodiment of the present technology described above, excellent battery characteristics can be obtained for a reason similar to that of the cylindrical secondary battery.

The other actions and effects are similar to those described for the cylindrical secondary battery described above.

Next, application examples of the secondary battery described above will be described.

A use of the secondary battery is not particularly limited as long as it is a machine, a device, an instrument, an apparatus, and a system (an aggregate of a plurality of devices or the like) in which the secondary battery can be used as a driving power supply, a power storage source for storing power, and the like. The secondary battery used as the power supply may be a main power supply or an auxiliary power supply. The main power supply is a power supply that is preferentially used regardless of whether or not other power supplies exist. The auxiliary power supply may be, for example, a power supply used instead of the main power supply, or a power supply switched from the main power supply if necessary. When the secondary battery is used as the auxiliary power supply, a type of main power supply is not limited to the secondary battery.

A use of the secondary battery is, for example, as follows. The use of the secondary battery is an electronic device (including a portable electronic device) such as a video camera, a digital still camera, a mobile phone, a notebook computer, a cordless phone, a headphone stereo, a portable radio, a portable television (TV), a portable information terminal, and the like. The use of the secondary battery is a portable household appliance such as an electric shaver or the like. The use of the secondary battery is a storage device such as a backup power supply, a memory card and the like. The use of the secondary battery is an electric tool such as an electric drill, an electric saw and the like. The use of the secondary battery is a battery pack installed as a removable power supply in a notebook computer and the like. The use of the secondary battery is a medical electronic device such as a pacemaker, a hearing aid and the like. The use of the secondary battery is an electric vehicle such as an electric vehicle (including a hybrid car) and the like. The use of the secondary battery is a power storage system such as a household battery system for storing power in preparation for an emergency, or the like. Of course, the use of the secondary battery may be a use other than those described above.

Among them, it is effective that the secondary battery is applied to the battery pack, the electric vehicle, the power storage system, the electric tool, the electronic device, and the like. The reason is that since excellent battery characteristics are required in these uses, it is possible to effectively improve performance by using the secondary battery of the present technology. Note that the battery pack is a power supply using the secondary battery. The battery pack may use a single battery or may use an assembled battery as described later. The electric vehicle is a vehicle that operates (travels) using the secondary battery as a driving power supply, and as described above, may be a car (such as a hybrid car or the like) provided with a driving source other than the secondary battery. The power storage system is a system using the secondary battery as a power storage source. For example, in a household power storage system, power is stored in the secondary battery, which is the power storage source, and it is thus possible to use the power to use the household electrical appliance or the like. The electric tool is a tool in which a movable portion (for example, a drill or the like) can move using the secondary battery as a driving power supply. The electronic device is a device that exhibits various functions using the secondary battery as a driving power supply (power supply source).

Here, some application examples of the secondary battery will be specifically described. Note that the configurations of application examples described below are only an example, and can thus be appropriately changed.

Figure 6:
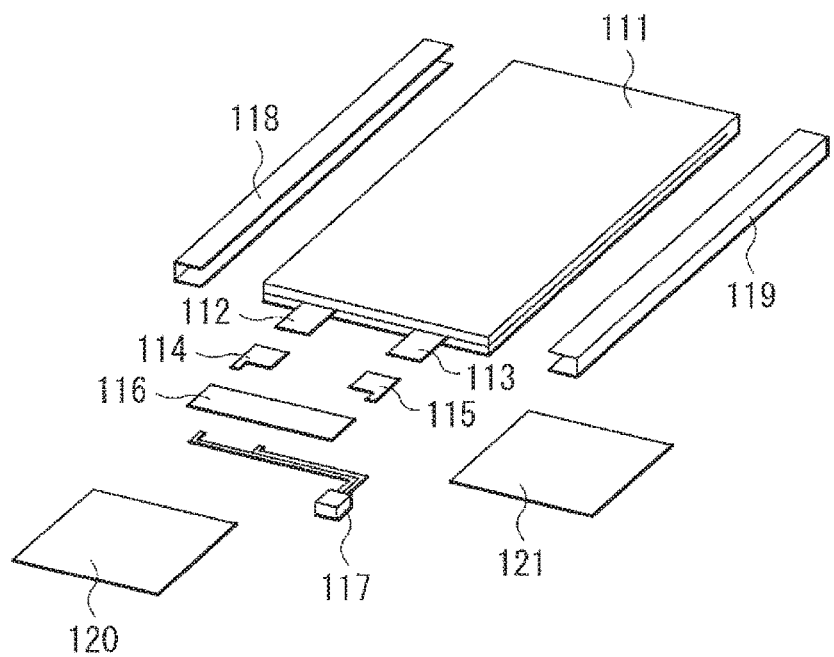
FIG. 6 is a perspective view illustrating a configuration of an application example (battery pack: single cell) of the secondary battery according to an embodiment of the present technology.
Figure 7:
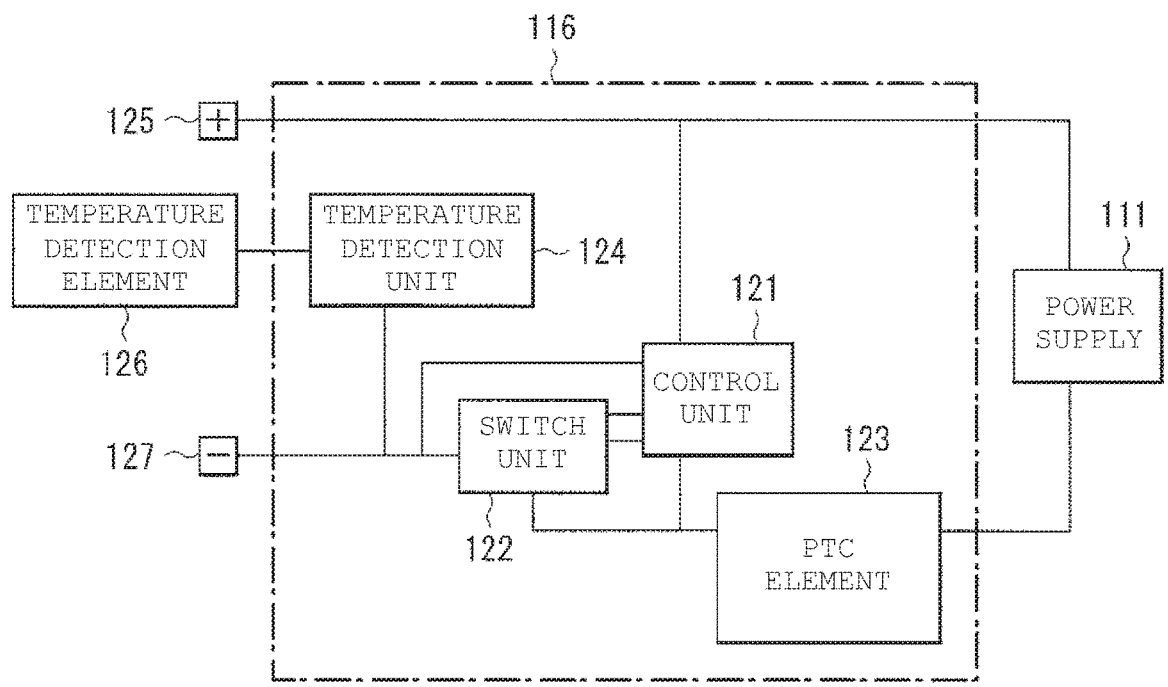
FIG. 7 is a block diagram illustrating a configuration of a battery pack illustrated in FIG. 6.

FIG. 6 is a perspective view illustrating a configuration of a battery pack using a single battery. FIG. 7 is a block diagram illustrating a configuration of the battery pack illustrated in FIG. 6. Note that an exploded view of the battery pack is illustrated in FIG. 6.

The battery pack described here is a simple battery pack (so-called soft pack) using one secondary battery of the present technology, and is mounted in, for example, an electronic device or the like represented by a smartphone. The battery pack includes, for example, a power supply 111, which is a laminated film type secondary battery, and a circuit board 116 connected to the power supply 111, as illustrated in FIG. 6. A cathode lead 112 and an anode lead 113 are attached to the power supply 111.

A pair of adhesive tapes 118 and 119 is attached to both side surfaces of the power supply 111, respectively. A protection circuit module (PCM) is formed on the circuit board 116. The circuit board 116 is connected to the cathode lead 112 through a tab 114 and is connected to the anode lead 113 through a tab 115. Furthermore, the circuit board 116 is connected to a lead wire 117 with a connector for external connection. Note that the circuit board 116 is protected by a label 120 and an insulating sheet 121 in a state where the circuit board 116 is connected to the power supply 111. By attaching the label 120, the circuit board 116, the insulating sheet 121, and the like are fixed.

Furthermore, the battery pack includes, for example, the power supply 111 and the circuit board 116, as illustrated in FIG. 7. The circuit board 116 includes, for example, a control unit (controller) 121, a switch unit 122, a PTC element 123, and a temperature detection unit 124 The power supply 111 can be connected to the outside through a cathode terminal 125 and an anode terminal 127, and is charged and discharged through the cathode terminal 125 and the anode terminal 127. The temperature detection unit 124 detects a temperature using a temperature detection terminal (so-called T terminal) 126.

The control unit 121 controls an operation of the entire battery pack (including a use state of the power supply 111). The control unit 121 includes, for example, a central processing unit (CPU) or processor, a memory and the like.

For example, when a battery voltage reaches an overcharge detection voltage, the control unit 121 prevents a charge current from flowing through a current path of the power supply 111 by disconnecting the switch unit 122. Furthermore, for example, when a large current flows during charging, the control unit 121 cuts off the charge current by disconnecting the switch unit 122.

On the other hand, for example, when the battery voltage reaches an overdischarge detection voltage, the control unit 121 prevents a discharge current from flowing through the current path of the power supply 111 by disconnecting the switch unit 122. Furthermore, for example, when a large current flows during discharging, the control unit 121 cuts off the discharge current by disconnecting the switch unit 122.

It should be understood that the overcharge detection voltage is, for example, 4.2 V±0.05 V, and the overdischarge detection voltage is, for example, 2.4 V±0.1 V.

The switch unit (switch) 122 switches the use state of the power supply 111, that is, connection or disconnection between the power supply 111 and an external device, according to an instruction from the control unit 121. The switch unit 122 includes, for example, a charge control switch, a discharge control switch and the like. Each of the charge control switch and the discharge control switch is, for example, a semiconductor switch such as a metal oxide semiconductor field effect transistor (MOSFET) or the like. Note that the charge and discharge currents are detected based on, for example, turn-on resistance of the switch unit 122.

The temperature detection unit 124 measures a temperature of the power supply 111 and outputs a measurement result of the temperature to the control unit 121. The temperature detection unit 124 includes, for example, a temperature detection element such as a thermistor or the like. Note that the measurement result of the temperature measured by the temperature detection unit 124 is used, for example, when the control unit 121 performs charge and discharge control at the time of abnormal heat generation, when the control unit 121 performs correction processing at the time of calculating the remaining capacity, or the like.

It should be understood that the circuit board 116 may not have the PTC element 123. In this case, the circuit board 116 may be separately provided with a PTC element.

Figure 8:
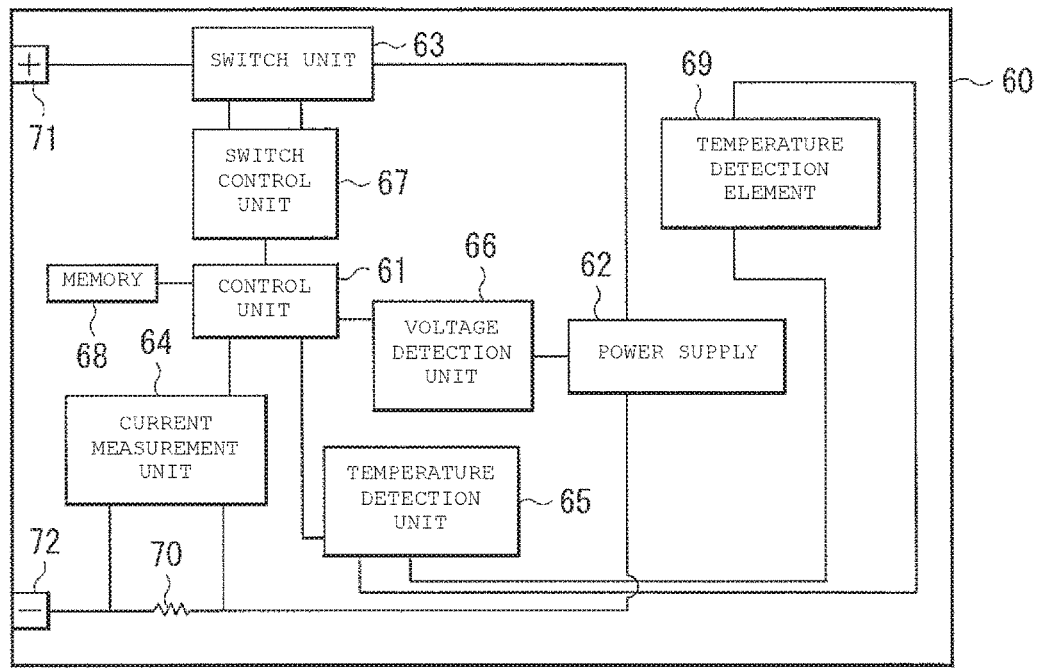
FIG. 8 is a block diagram illustrating a configuration of an application example (battery pack: assembled battery) of the secondary battery according to an embodiment of the present technology.

FIG. 8 is a perspective view illustrating a configuration of a battery pack using an assembled battery.

The battery pack includes, for example, a control unit (controller) 61, a power supply 62, a switch unit 63, a current measurement unit 64, a temperature detection unit 65, a voltage detection unit 66, a switch control unit 67, a memory 68, a temperature detection element 69, a current detection resistor 70, a cathode terminal 71, and an anode terminal 72 that are arranged in a housing 60. The housing 60 includes, for example, a plastic material or the like.

The control unit 61 controls an operation of the entire battery pack (including a use state of the power supply 62). The control unit 61 includes, for example, a CPU or processor, or the like. The power supply 62 is an assembled battery including two or more secondary batteries of the present technology, and the two or more secondary batteries may be connected to each other in series, in parallel, or in series and in parallel. As one example, the power supply 62 includes six secondary batteries connected to each other in two parallels and three series.

The switch unit (switch) 63 switches the use state of the power supply 62, that is, connection between the power supply 62 and an external device, according to an instruction from the control unit 61. The switch unit 63 includes, for example, a charge control switch, a discharge control switch, a charge diode, a discharge diode, and the like. Each of the charge control switch and the discharge control switch is, for example, a semiconductor switch such as a metal oxide semiconductor field effect transistor (MOSFET) or the like.

The current measurement unit 64 measures a current using the current detection resistor 70, and outputs a measurement result of the current to the control unit 61. The temperature detection unit 65 measures a temperature using the temperature detection element 69, and outputs a measurement result of the temperature to the control unit 61. The measurement result of the temperature is used, for example, when the control unit 61 performs charge and discharge control at the time of abnormal heat generation, when the control unit 61 performs correction processing at the time of calculating the remaining capacity, or the like. The voltage detection unit 66 measures a voltage of the secondary battery in the power supply 62, and supplies a measurement result of the analog-digital converted voltage to the control unit 61.

The switch control unit 67 controls an operation of the switch unit 63 according to signals input from each of the current measurement unit 64 and the voltage detection unit 66.

For example, when a battery voltage reaches an overcharge detection voltage, the switch control unit 67 prevents a charge current from flowing through a current path of the power supply 62 by disconnecting the switch unit (charge control switch) 63. Thus, in the power supply 62, only discharging can be performed through the discharge diode. Note that the switch control unit 67 cuts off the charge current, for example, when a large current flows during charging.

Furthermore, for example, when a battery voltage reaches an overdischarge detection voltage, the switch control unit 67 prevents a discharge current from flowing through the current path of the power supply 62 by disconnecting the switch unit (discharge control switch) 63. Thus, in the power supply 62, only charging can be performed through the charge diode. Note that the switch control unit 67 cuts off the discharge current, for example, when a large current flows during discharging.

Note that the overcharge detection voltage is, for example, 4.2 V±0.05 V, and the overdischarge detection voltage is, for example, 2.4 V±0.1 V.

The memory 68 includes, for example, an electrically erasable and programmable read only memory (EEPROM) or the like, which is a non-volatile memory. For example, numerical values calculated by the control unit 61, information (for example, internal resistance in an initial state, or the like) of the secondary battery measured in a manufacturing process step, and the like, are stored in the memory 68. Note that if a full charge capacity of the secondary battery is stored in the memory 68, the control unit 61 can grasp information such as the remaining capacity or the like.

The temperature detection element 69 measures a temperature of the power supply 62 and outputs a measurement result of the temperature to the control unit 61. The temperature detection element 69 includes, for example, a thermistor or the like.

Each of the cathode terminal 71 and the anode terminal 72 is a terminal connected to an external device (for example, a notebook personal computer or the like) operated using the battery pack, an external device (for example, a charger or the like) used for charging the battery pack, and the like. The power supply 62 is charged and discharged through the cathode terminal 71 and the anode terminal 72.

Figure 9:
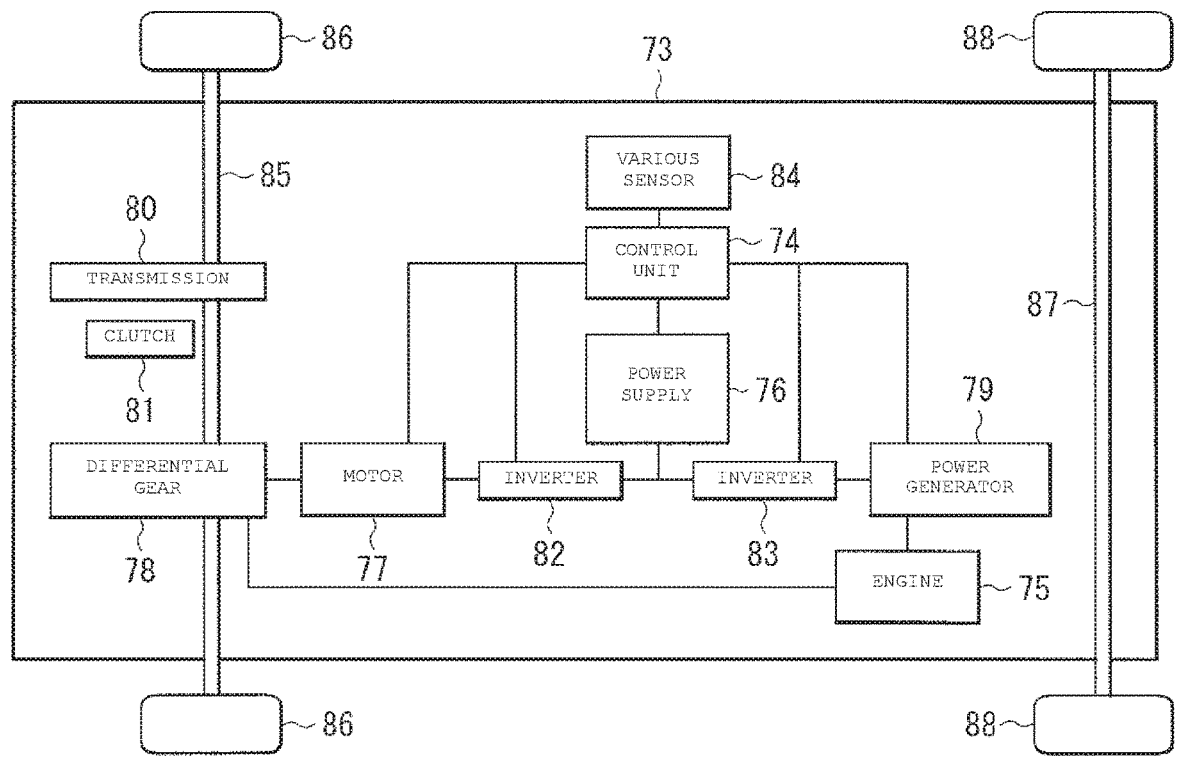
FIG. 9 is a block diagram illustrating a configuration of an application example (electric motor vehicle) of the secondary battery according to an embodiment of the present technology.

FIG. 9 illustrates a block configuration of a hybrid car as an example of the electric motor vehicle.

The electric motor vehicle includes, for example, a control unit (controller) 74, an engine 75, a power supply 76, a driving motor 77, a differential gear 78, a power generator 79, a transmission 80, a clutch 81, inverters 82 and 83, and various sensors 84 in a metal housing 73. In addition, the electric motor vehicle includes, for example, a front-wheel driving shaft 85 and front wheels 86, and a rear-wheel driving shaft 87 and rear wheels 88 connected to the differential gear 78 and the transmission 80.

The electric motor vehicle can travel by using, for example, any one of the engine 75 and the motor 77 as a driving source. The engine 75 is a main driving source and for example, is a gasoline engine or the like. In a case where the engine 75 is used as the driving source, for example, a driving force (rotational force) of the engine 75 is transferred to the front wheels 86 and the rear wheels 88 through the differential gear 78 which is a driving unit, the transmission 80, and the clutch 81. Since the rotational force of the engine 75 is transferred to the power generator 79, the power generator 79 generates alternating current (AC) power by using the rotational force, and the AC power is converted into direct current (DC) power through the inverter 83, such that the DC power is accumulated in the power supply 76. Meanwhile, in a case where the motor 77 which is a converting unit (converter) is used as the driving source, since power (DC power) supplied from the power supply 76 is converted into AC power through the inverter 82, the motor 77 is driven by using the AC power. The driving force (rotational force) converted from the power by the motor 77 is transferred to, for example, the front wheels 86 and the rear wheels 88 through the differential gear 78 which is the driving unit (driver), the transmission 80, and the clutch 81.

When the electric motor vehicle decelerates through a brake mechanism, a resistance force at the time of the deceleration is transferred as the rotational force to the motor 77. Therefore, the motor 77 may generate the AC power by using the rotational force.

Since the AC power is converted into the DC power through the inverter 82, it is preferable that the DC regenerative power is accumulated in the power supply 76.

The control unit (controller) 74 controls an operation of the entire electric motor vehicle. The control unit 74 includes, for example, a central processing unit (CPU), or a processor or the like. The power supply 76 includes one or more secondary batteries of the present technology. The power supply 76 is connected to an external power supply, and may accumulate power by receiving power supplied from the external power supply. The various sensors 84 is used to, for example, control a speed of the engine 75 and control an opening degree (throttle opening degree) of a throttle valve. The various sensors 84 include, for example, one or more of a speed sensor, an acceleration sensor, an engine speed sensor, and the like.

Although a case where the electric motor vehicle is the hybrid car has been described as an example, the electric motor vehicle may also be a vehicle (electric vehicle) operated by using only the power supply 76 and the motor 77, without using the engine 75.

Figure 10:
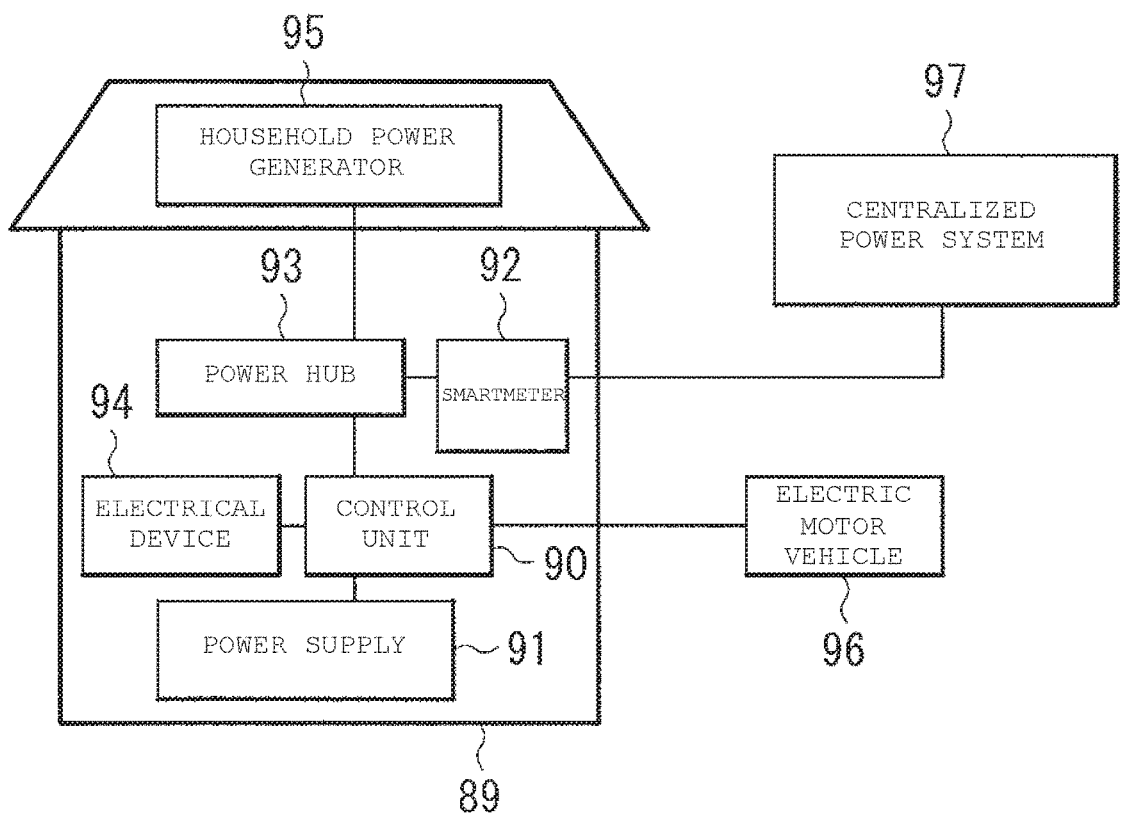
FIG. 10 is a block diagram illustrating a configuration of an application example (power storage system) of the secondary battery according to an embodiment of the present technology.

FIG. 10 illustrates a block configuration of a power storage system.

The power storage system includes, for example, a control unit (controller) 90, a power supply 91, a smart meter 92, and a power hub 93 in a house 89 such as a general residential house, a commercial building, and the like.

Here, the power supply 91 can be connected to, for example, an electrical device 94 installed in the house 89 and connected to an electric motor vehicle 96 stopped outside the house 89. In addition, the power supply 91 can be connected to, for example, a household power generator 95 installed in the house 89 through the power hub 93 and connected to an external centralized power system 97 through the smart meter 92 and the power hub 93.

The electrical device 94 includes, for example, one or more household appliances, and examples of the household appliances include a refrigerator, an air conditioner, a television, a water heater, and the like. The household power generator 95 includes, for example, one or more of a solar power generator, a wind power generator, and the like. The electric motor vehicle 96 includes, for example, one or more of an electric vehicle, an electric motorcycle, a hybrid car, and the like. The centralized power system 97 includes, for example, one or more of a thermoelectric power plant, a nuclear power plant, a hydroelectric power plant, a wind power plant, and the like.

The control unit 90 controls an operation (including a use state of the power supply 91) of the entire power storage system. The control unit 90 includes, for example, a CPU, or a processor or the like. The power supply 91 includes one or more secondary batteries of the present technology. The smart meter 92 is, for example, a network-compatible wattmeter installed in the house 89 which is a power demand side, and can perform communication with a power supply side. Accordingly, the smart meter 92 controls, for example, a balance between demand and supply of power in the house 89 while performing communication with the outside, thereby enabling stable and high-efficient supply of energy.

In the power storage system, for example, power is accumulated in the power supply 91, the power being supplied from the centralized power system 97 which is an external power supply through the smart meter 92 and the power hub 93, and power is accumulated in the power supply 91, the power being supplied from the household power generator 95 which is an independent power supply through the power hub 93. Since the power accumulated in the power supply 91 is supplied to the electrical device 94 and the electric motor vehicle 96 according to an instruction of the control unit 90, the electrical device 94 can be operated and at the same time, the electric motor vehicle 96 can be charged. That is, the power storage system is a system which enables accumulation and supply of power in the house 89 using the power supply 91.

The power accumulated in the power supply 91 can be used as necessary. For this reason, for example, the power supplied from the centralized power system 97 can be accumulated in the power supply 91 in the night time when electricity tariff is low, and the power accumulated in the power supply 91 can be used in the day time when electricity tariff is high.

It should be noted that the power storage system described above may be installed for each house (each household), or may be installed for a plurality of houses (a plurality of households).

Figure 11:
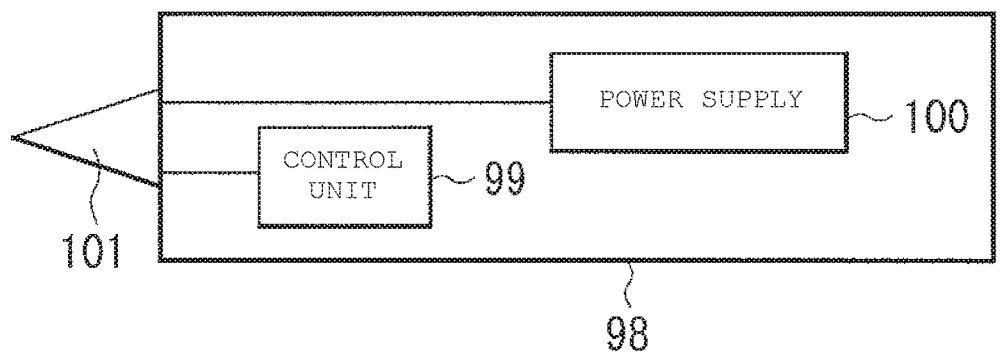
FIG. 11 is a block diagram illustrating a configuration of an application example (electric tool) of the secondary battery according to an embodiment of the present technology.

FIG. 11 illustrates a block configuration of an electric tool.

The electric tool described herein is, for example, an electric drill. The electric tool includes, for example, a control unit (controller) 99 and a power supply 100 in a tool body 98. For example, a drilling unit 101 which is a movable unit is operably (rotatably) attached to the tool body 98.

The tool body 98 is formed of, for example, a plastic material or the like. The control unit 99 controls an operation (including a use state of the power supply 100) of the entire electric tool. The control unit 99 includes, for example, a CPU, a processor or the like. The power supply 100 includes one or more secondary batteries of the present technology. The control unit 99 controls supply of power from the power supply 100 to the drilling unit 101 according to an operation of an operating switch.

EXAMPLE

Examples of the present technology will be described.

Experimental Examples 1 to 22

The laminated film type lithium ion secondary battery illustrated in FIGS. 4 and 5 was manufactured by the following procedure.

In a case of manufacturing a cathode 33, first, 98 parts by mass of a cathode active material ($LiCoO_2$), 1 part by mass of a cathode binder (polyvinylidene fluoride), and 1 part by mass of a cathode conductive agent (carbon black) were mixed with each other to form a cathode mixture. Next, the cathode mixture was introduced into an organic solvent (N-methyl-2-pyrrolidone) and then the organic solvent was stirred to form a paste-like cathode mixture slurry. Next, the cathode mixture slurry was coated on both surfaces of a cathode current collector 33A (a band-shaped aluminum foil having a thickness of 20 μm) by using a coater, and then the cathode mixture slurry was dried to form a cathode active material layer 33B. Finally, the cathode active material layer 33B was compression molded using a roll press or the like.

In a case of manufacturing an anode 34, first, a plurality of first anode active material particles (graphite), a plurality of second anode active material particles (graphite), a first anode binder (styrene-butadiene rubber (SBR)), a second anode binder (polyvinylidene fluoride (PVDF)), and a thickener (carboxymethyl cellulose) were mixed with each other to form an anode mixture.

An R value and a median diameter D50 (μm) of the plurality of first anode active material particles, an R value and a median diameter D50 (μm) of the plurality of second anode active material particles, a mixing ratio (% by weight) of the plurality of first anode active material particles, a mixing ratio (% by weight) of the plurality of second anode active material particles, and a ratio P relating to a graphite orientation of the plurality of first anode active material particles and the plurality of second anode active material particles are as represented by Tables 1 and 2 below. A method for measuring the R value and a method for measuring the ratio P are as described above.

In this case, a plurality of types of the plurality of first anode active material particles having different R values were used to change the R value, and a plurality of types of the plurality of first anode active material particles having different median diameters D50 were used to change the median diameter D50. The R value and the median diameter D50 of the plurality of second anode active material particles were changed, respectively, by the same procedure. One or both of a mixing amount of the plurality of first anode active material particles and a mixing amount of the plurality of second anode active material particles were changed to change the mixing ratios.

A mixing ratio (weight ratio) of the plurality of first anode active material particles, the plurality of second anode active material particles, the first anode binder, the second anode binder, and the thickener was 9:2:1 ((the plurality of first anode active material particles+the plurality of second anode active material particles):(the first anode binder+the second anode binder):thickener). A mixing ratio (% by weight) of the first anode binder and a mixing ratio (% by weight) of the second anode binder are as represented by Tables 1 and 2 below.

For comparison, only one of the first anode binder and the second anode binder was used without using both of the first anode binder and the second anode binder.

Next, the anode mixture was introduced into an aqueous solvent (pure water) and then the aqueous solvent was stirred to form a paste-like anode mixture slurry. Next, the anode mixture slurry was coated on both surfaces of an anode current collector 34A (a band-shaped copper foil having a thickness of 15 μm) by using a coater, and then the anode mixture slurry was dried to form an anode active material layer 34B. Finally, the anode active material layer 34B was compression molded using a roll press or the like.

In a case of preparing an electrolytic solution, an electrolyte salt ($LiPF_6$) was added to a non-aqueous solvent (ethylene carbonate and propylene carbonate), and then the non-aqueous solvent was stirred to dissolve the electrolyte salt in the non-aqueous solvent. In this case, a mixing ratio (weight ratio) of ethylene carbonate to propylene carbonate was 50:50 (ethylene carbonate:propylene carbonate). A content of the electrolyte salt was 1 mol/kg with respect to the non-aqueous solvent.

In a case of forming an electrolyte layer 36, first, an electrolytic solution, a polymer compound (polyvinylidene fluoride) and an organic solvent (ethyl carbonate) for dilution were mixed with each other to prepare a precursor solution. In this case, a mixing ratio (weight ratio) of the electrolytic solution to the polymer compound was 90:10 (electrolytic solution:polymer compound). Finally, the precursor solution was coated on a surface of the cathode 33, and then dried to form a gel-like electrolyte layer 36. Furthermore, the precursor solution was coated on a surface of the anode 34, and then the precursor solution was dried to form a gel-like electrolyte layer 36.

In a case of assembling a secondary battery, first, an aluminum cathode lead 31 was welded to the cathode current collector 33A and a copper anode lead 32 was welded to the anode current collector 34A.

Next, the cathode 33 on which the electrolyte layer 36 is formed and the anode 34 on which the electrolyte layer 36 is formed were laminated with a separator 35 (a microporous polyethylene stretched film having a thickness of 20 μm) interposed therebetween to obtain a laminate. Next, the laminate was wound in a longitudinal direction, and then a protection tape 37 was adhered to the outermost circumference of the laminate to manufacture a wound electrode body 30. Finally, an exterior member 40 was folded to interpose the wound electrode body 30 therebetween and then outer peripheral portions of the exterior member 40 were thermally fused to each other. The exterior member 40 is an aluminum laminate film in which a nylon film having a thickness of 25 μm, an aluminum foil having a thickness of 40 μm, and a polypropylene film having a thickness of 30 μm are sequentially laminated from the outside. In this case, an adhesion film 41 was inserted between the cathode lead 31 and the exterior member 40 and at the same time, an adhesion film 41 was inserted between the anode lead 32 and the exterior member 40.

As a result, the wound electrode body 30 was sealed inside the exterior member 40, such that the laminated film type lithium ion secondary battery was completed.

In order to evaluate characteristics of the secondary battery, in a case where capacity characteristics of the secondary battery and cycle characteristics were examined, the results as shown in Tables 1 and 2 were obtained.

In a case of examining the capacity characteristics, first, in order to make the secondary battery be in a stable state, the charging and discharging (one cycle) of the secondary battery was performed in a normal temperature environment (temperature=25° C.). Subsequently, the discharge capacity (mAh) was measured by performing the charging and discharging (one cycle) of the secondary battery in the same environment. Finally, the discharge capacity described above was divided by a weight (g) of the two types of anode active materials (a plurality of first anode active material particles and a plurality of second anode active material particles), such that an initial capacity (mAh/g) was calculated.

At the time of charging, after constant current charging was conducted until a voltage reaches up to 4.3 V at a current of 1 C, constant current charging was conducted until the voltage reaches up to 4.3 V at a current of 0.05 C. At the time of discharging, constant current discharging was conducted until a voltage reaches up to 2.5 V at a current of 1 C. "1 C" is a current value at which the battery capacity (theoretical capacity) is discharged in 1 hour and "0.05 C" is a current value at which the battery capacity is discharged in 20 hours.

In a case of examining the cycle characteristics, first, in order to make the secondary battery be in a stable state, the charging and discharging (one cycle) of the secondary battery was performed in a normal temperature environment (temperature=25° C.). Subsequently, the discharge capacity (discharge capacity of $2^{nd}$ cycle) was measured by performing the charging and discharging (one cycle) of the secondary battery in the same environment. Subsequently, the charging and discharging of the secondary battery is repeated in the same environment until the total number of cycles reaches to 100 cycles, such that the discharge capacity (discharge capacity of $100^{th}$ cycle) was measured. Finally, capacity maintenance rate (%)=(discharge capacity of $100^{th}$ cycle/discharge capacity of $2^{nd}$ cycle)×100 was calculated.

The charging and discharging condition was the same as the case of examining capacity characteristics.

TABLE 1

| Plurality of first anode active material particles: graphite, plurality of second anode active material particles: graphite | | | | | | | | | | | | |
|---|---|---|---|---|---|---|---|---|---|---|---|---|
| | First anode active material particle | | | Second anode active material particle | | | First anode binder | | Second anode binder | | | |
| Experimental Example | R value | D50 (μm) | Mixing ratio (% by weight) | R value | D50 (μm) | Mixing ratio (% by weight) | Type | Mixing ratio (% by weight) | Type | Mixing ratio (% by weight) | Ratio P | Initial capacity (mAh/g) | Capacity maintenance rate (%) |
| 1 | 0.4 | 10 | 30 | 0.1 | 15 | 70 | SBR | 1 | PVDF | 1 | 40 | 365 | 94.1 |
| 2 | 0.4 | 10 | 50 | 0.1 | 15 | 50 | SBR | 1 | PVDF | 1 | 39 | 364 | 94 |
| 3 | 0.4 | 10 | 10 | 0.1 | 15 | 90 | SBR | 1 | PVDF | 1 | 41 | 367 | 93.8 |
| 4 | 0.4 | 10 | 30 | 0.2 | 15 | 70 | SBR | 1 | PVDF | 1 | 38 | 363 | 94 |
| 5 | 0.4 | 10 | 30 | 0.25 | 15 | 70 | SBR | 1 | PVDF | 1 | 38 | 363 | 94 |
| 6 | 0.35 | 10 | 30 | 0.1 | 15 | 70 | SBR | 1 | PVDF | 1 | 41 | 366 | 93.9 |
| 7 | 0.45 | 10 | 30 | 0.1 | 15 | 70 | SBR | 1 | PVDF | 1 | 38 | 364 | 94.2 |
| 8 | 0.4 | 5 | 30 | 0.1 | 15 | 70 | SBR | 1 | PVDF | 1 | 36 | 364 | 94.2 |
| 9 | 0.4 | 14.5 | 30 | 0.1 | 15 | 70 | SBR | 1 | PVDF | 1 | 42 | 365 | 93.4 |
| 10 | 0.4 | 10 | 30 | 0.1 | 25 | 70 | SBR | 1 | PVDF | 1 | 42 | 367 | 93.4 |

TABLE 2

Plurality of first anode active material particles: graphite, plurality of second anode active material particles: graphite

| | First anode active material particle | | | Second anode active material particle | | | First anode binder | | Second anode binder | | | | |
|---|---|---|---|---|---|---|---|---|---|---|---|---|---|
| Experimental Example | R value | D50 (μm) | Mixing ratio (% by weight) | R value | D50 (μm) | Mixing ratio (% by weight) | Type | Mixing ratio (% by weight) | Type | Mixing ratio (% by weight) | Ratio P | Initial capacity (mAh/g) | Capacity maintenance rate (%) |
| 11 | 0.4 | 10 | 30 | 0.2 | 15 | 70 | SBR | 2 | PVDF | — | 50 | 365 | 90.8 |
| 12 | 0.4 | 10 | 30 | 0.2 | 15 | 70 | SBR | — | PVDF | 2 | 51 | 365 | 90.3 |
| 13 | 0.4 | 10 | 70 | 0.1 | 15 | 30 | SBR | 1 | PVDF | 1 | 39 | 360 | 94.2 |
| 14 | 0.4 | 10 | 0 | 0.1 | 15 | 100 | SHR | 1 | PVDF | 1 | 48 | 366 | 92.3 |
| 15 | 0.4 | 10 | 30 | 0.3 | 15 | 70 | SBR | 1 | PVDF | 1 | 37 | 360 | 94.1 |
| 16 | 0.4 | 10 | 30 | 0.05 | 15 | 70 | SBR | 1 | PVDF | 1 | 48 | 366 | 92.4 |
| 17 | 0.3 | 10 | 30 | 0.1 | 15 | 70 | SBR | 1 | PVDF | 1 | 47 | 365 | 91.9 |
| 18 | 0.5 | 10 | 30 | 0.1 | 15 | 70 | SBR | 1 | PVDF | 1 | 38 | 361 | 94.1 |
| 19 | 0.4 | 2.5 | 30 | 0.1 | 15 | 70 | SBR | 1 | PVDF | 1 | 35 | 359 | 94.3 |
| 20 | 0.4 | 20 | 30 | 0.1 | 15 | 70 | SBR | 1 | PVDF | 1 | 48 | 366 | 91.3 |
| 21 | 0.4 | 10 | 30 | 0.1 | 10 | 70 | SBR | 1 | PVDF | 1 | 35 | 358 | 94.3 |
| 22 | 0.4 | 10 | 30 | 0.1 | 30 | 70 | SBR | 1 | PVDF | 1 | 49 | 367 | 91 |

Each of the initial capacity and the capacity maintenance rate was changed depending on a condition related to each of the plurality of first anode active material particles, the plurality of second anode active material particles, the first anode binder, and the second anode binder.

Specifically, in a case where the conditions related to the materials, the physical properties, the dimensions, the mixing ratios, and the presence and absence of each of the plurality of first anode active material particles, the plurality of second anode active material particles, the first anode binder, and the second anode binder were optimized (Experimental Examples 1 to 10), a high initial capacity was secured and a capacity maintenance rate was increased as compared to a case where these conditions were not optimized (Experimental Examples 11 to 22).

The optimal conditions related to the materials, the physical properties, the dimensions, the mixing ratios, and the presence and absence described above are as follows. First, an R value of the first anode active material particles is 0.35 to 0.45 and a median diameter D50 of the plurality of first anode active material particles is 5 μm to 14.5 μm. Second, an R value of the second anode active material particles is 0.1 to 0.25 and a median diameter D50 of the plurality of second anode active material particles is 15 μm to 25 μm. Third, a ratio of a weight (mixing ratio) of the plurality of first anode active material particles to a total of the weight of the plurality of first anode active material particles and a weight of the plurality of second anode active material particles is 10% by weight to 50% by weight. Fourth, the anode 34 includes both the first anode binder (styrene-butadiene rubber) and the second anode binder (polyvinylidene fluoride).

In particular, in a case where the conditions related to the materials, the physical properties, the dimensions, the mixing ratios, and the presence and absence of each of the plurality of first anode active material particles, the plurality of second anode active material particles, the first anode binder, and the second anode binder were optimized (Experimental Examples 1 to 10), if a ratio P was 36 to 42, a sufficient initial capacity could be obtained and a sufficient capacity maintenance rate could also be obtained.

As a results shown in Tables 1 and 2, in a case where the anode 34 included the plurality of first anode active material particles, the plurality of second anode active material particles, the first anode binder, and the second anode binder, and the conditions related to the materials, the physical properties, the dimensions, the mixing ratios, and the presence and absence thereof were optimized, the capacity characteristics were secured and the cycle characteristics were improved. Therefore, excellent battery characteristics in the secondary battery were obtained.

The present technology has been described above with reference to an embodiment and example, but the present technology is not limited to an aspect described in the embodiment and example, and various modifications are possible.

For example, in order to describe a configuration of the secondary battery of the present technology, the case where the battery structure is a cylindrical type or laminated film type and the battery element has a wound structure has been described by the way of example. However, the secondary battery of the present technology is applicable to a case where the secondary battery has other battery structures such as a square shape, a coil shape, a button shape, and the like, and is also applicable to a case where a battery element has other structures such as a laminated structure and the like.

In addition, for example, the anode for a secondary battery of the present technology is not limited to a secondary battery and may be applicable to other electrochemical devices. The other electrochemical devices, for example, are capacitor and the like.

It should be noted that the effects described in this specification is merely an example but is not limited thereto and may be other effects.

The present technology is described below in further detail according to an embodiment.

(1)

A secondary battery including:

a cathode, an anode, and an electrolytic solution in which the anode includes a plurality of first anode active material particles, a plurality of second anode active material particles, a first anode binder, and a second anode binder, each of the plurality of first anode active material particles contains carbon as a constituent element, and an R value of the plurality of first anode active material particles is 0.35 or more and 0.45 or less, and a median diameter D50 of the plurality of first anode active material particles is 5 μm or more and 14.5 μm or less, each of the plurality of second anode active material particles contains carbon as a constituent element, and an R value of the plurality of second anode active material particles is 0.1 or more and 0.25 or less, and a median diameter D50 of the plurality of second anode active material particles is 15 μm or more and 25 μm or less, a ratio of a weight of the plurality of first anode active material particles to a total of the weight of the plurality of first anode active material particles and a weight of the plurality of second anode active material particles is 10% by weight or more and 50% by weight or less, the first anode binder contains at least one of styrene-butadiene rubber and a derivative thereof, and the second anode binder contains at least one of polyvinylidene fluoride and a derivative thereof.

(2)

The secondary battery described in (1), in which a ratio P (=P2/P1) of a peak integrated intensity P2 resulting from (002) plane of the plurality of first anode active material particles and the plurality of second anode active material particles measured by an X-ray diffraction method to a peak integrated intensity P1 resulting from (110) planes of the plurality of first anode active material particles and the plurality of second anode active material particles measured by the X-ray diffraction method is 36 or more and 42 or less.

(3)

The secondary battery described in (1) or (2), in which the secondary battery is a lithium ion secondary battery.

(4)

An anode for a secondary battery including:

a plurality of first anode active material particles, a plurality of second anode active material particles, a first anode binder, and a second anode binder, in which each of the plurality of first anode active material particles contains carbon as a constituent element, and an R value of the plurality of first anode active material particles is 0.35 or more and 0.45 or less, and a median diameter D50 of the plurality of first anode active material particles is 5 μm or more and 14.5 μm or less, each of the plurality of second anode active material particles contains carbon as a constituent element, and an R value of the plurality of second anode active material particles is 0.1 or more and 0.25 or less, and a median diameter D50 of the plurality of second anode active material particles is 15 μm or more and 25 μm or less, a ratio of a weight of the plurality of first anode active material particles to a total of the weight of the plurality of first anode active material particles and a weight of the plurality of second anode active material particles is 10% by weight or more and 50% by weight or less, the first anode binder contains at least one of styrene-butadiene rubber and a derivative thereof, and the second anode binder contains at least one of polyvinylidene fluoride and a derivative thereof.

(5)

A battery pack including:

the secondary battery described in any one of (1) to (3);

a control unit which controls an operation of the secondary battery; and a switch unit which switches the operation of the secondary battery according to an instruction of the control unit.

(6)

An electric motor vehicle including:

the secondary battery described in any one of (1) to (3);

a conversion unit which converts power supplied from the secondary battery into a driving force;

a driving unit which performs a driving operation depending on the driving force; and a control unit which controls an operation of the secondary battery.

(7)

A power storage system including: the secondary battery described in any one of (1) to (3);

one or two or more electric devices which are supplied with power from the secondary power; and a control unit which controls supply of power from the secondary battery to the electric device.

(8)

An electric tool including: the secondary battery described in any one of (1) to (3); and a movable unit which is supplied with power from the secondary battery.

(9)

An electric device including the secondary battery described in any one of (1) to (3) as a power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:

a cathode, an anode, and an electrolytic solution, wherein the anode includes a plurality of first anode active material particles, a plurality of second anode active material particles, a first anode binder, and a second anode binder, wherein the plurality of first anode active material particles include carbon, and an R value of the plurality of first anode active material particles is from 0.35 to 0.45, and a median diameter of the plurality of first anode active material particles is from 5 μm to 14.5 μm, wherein the plurality of second anode active material particles include carbon, and an R value of the plurality of second anode active material particles is from 0.1 to 0.25, and a median diameter of the plurality of second anode active material particles is from 15 μm to 25 μm, wherein a ratio of a weight of the plurality of first anode active material particles to a total of the weight of the plurality of first anode active material particles and a weight of the plurality of second anode active material particles is from 10% by weight to 50% by weight, wherein the first anode binder includes one or both of styrene-butadiene rubber and a derivative of styrene-butadiene rubber, and wherein the second anode binder includes one or both of polyvinylidene fluoride and a derivative of polyvinylidene fluoride, wherein a ratio P (P2/P1) of a peak integrated intensity P2 resulting from (002) plane of the plurality of first anode active material particles and the plurality of second anode active material particles measured by an X-ray diffraction method to a peak integrated intensity P1 resulting from (110) planes of the plurality of first anode active material particles and the plurality of second anode active material particles measured by the X-ray diffraction method is from 36 to 42.

2. The secondary battery according to claim 1, wherein the secondary battery includes a lithium ion secondary battery.

3. The secondary battery according to claim 1, further comprising a separator provided between the cathode and the anode.

4. The secondary battery according to claim 3, wherein the separator includes one or more porous films.

5. An electric motor vehicle comprising:
the secondary battery according to claim 1;
a converter configured to convert power supplied from the secondary battery into a driving force;
a driver configured to perform a driving operation depending on the driving force; and
a controller configured to control an operation of the secondary battery.

6. A power storage system comprising:
the secondary battery according to claim 1;
one or two or more electric devices which are configured to be supplied with power from the secondary power; and
a controller configured to control supply of power from the secondary battery to the electric device.

7. An electric tool comprising:
the secondary battery according to claim 1;
a movable unit configured to be supplied with power from the secondary battery.

8. An electric device comprising:
the secondary battery according to claim 1 as a power supply source.

9. An anode for a secondary battery, comprising:
a plurality of first anode active material particles, a plurality of second anode active material particles, a first anode binder, and a second anode binder,
wherein the plurality of first anode active material particles include carbon, and an R value of the plurality of first anode active material particles is from 0.35 to 0.45, and a median diameter of the plurality of first anode active material particles is from 5 μm to 14.5 μm,
wherein the plurality of second anode active material particles include carbon, and an R value of the plurality of second anode active material particles is from 0.1 to 0.25, and a median diameter of the plurality of second anode active material particles is from 15 μm to 25 μm,
wherein a ratio of a weight of the plurality of first anode active material particles to a total of the weight of the plurality of first anode active material particles and a weight of the plurality of second anode active material particles is from 10% by weight to 50% by weight,
wherein the first anode binder includes one or both of styrene-butadiene rubber and a derivative of styrene-butadiene rubber, and
wherein the second anode binder includes one or both of polyvinylidene fluoride and a derivative of polyvinylidene fluoride,
wherein a ratio P (P2/P1) of a peak integrated intensity P2 resulting from (002) plane of the plurality of first anode active material particles and the plurality of second anode active material particles measured by an X-ray diffraction method to a peak integrated intensity P1 resulting from (110) planes of the plurality of first anode active material particles and the plurality of second anode active material particles measured by the X-ray diffraction method is from 36 to 42.

10. A battery pack comprising:
a secondary battery;
a controller configured to control an operation of the secondary battery; and
a switch configured to switch the operation of the secondary battery according to an instruction of the controller,
wherein the secondary battery includes a cathode, an anode, and an electrolytic solution,
the anode includes a plurality of first anode active material particles, a plurality of second anode active material particles, a first anode binder, and a second anode binder,
wherein the plurality of first anode active material particles include carbon, and an R value of the plurality of first anode active material particles is from 0.35 to 0.45, and a median diameter of the plurality of first anode active material particles is from 5 μm to 14.5 μm,
wherein the plurality of second anode active material particles include carbon, and an R value of the plurality of second anode active material particles is from 0.1 to 0.25, and a median diameter of the plurality of second anode active material particles is from 15 μm to 25 μm,
wherein a ratio of a weight of the plurality of first anode active material particles to a total of the weight of the plurality of first anode active material particles and a weight of the plurality of second anode active material particles is from 10% by weight to 50% by weight,
wherein the first anode binder includes one or both of styrene-butadiene rubber and a derivative of styrene-butadiene rubber, and
wherein the second anode binder includes one or both of polyvinylidene fluoride and a derivative of polyvinylidene fluoride,
wherein a ratio P (P2/P1) of a peak integrated intensity P2 resulting from (002) plane of the plurality of first anode active material particles and the plurality of second anode active material particles measured by an X-ray diffraction method to a peak integrated intensity P1 resulting from (110) planes of the plurality of first anode active material particles and the plurality of second anode active material particles measured by the X-ray diffraction method is from 36 to 42.

* * * * *